(12) United States Patent
Mino et al.

(10) Patent No.: US 7,532,405 B2
(45) Date of Patent: May 12, 2009

(54) MICRO LENS, MICRO LENS ARRAY, AND METHOD OF MANUFACTURING THE SAME

(75) Inventors: Norihisa Mino, Osaka (JP); Takeo Yasuho, Osaka (JP)

(73) Assignee: Panasonic Corporation, Osaka (JP)

( * ) Notice: Subject to any disclaimer, the term of this patent is extended or adjusted under 35 U.S.C. 154(b) by 117 days.

(21) Appl. No.: 11/664,816

(22) PCT Filed: Oct. 5, 2005

(86) PCT No.: PCT/JP2005/018427

§ 371 (c)(1),
(2), (4) Date: Apr. 6, 2007

(87) PCT Pub. No.: WO2006/038648

PCT Pub. Date: Apr. 13, 2006

(65) Prior Publication Data

US 2008/0186585 A1    Aug. 7, 2008

(30) Foreign Application Priority Data

Oct. 6, 2004  (JP)  .............................. 2004-293608

(51) Int. Cl.
G02B 27/10  (2006.01)
G02B 3/00  (2006.01)
B05B 5/06  (2006.01)

(52) U.S. Cl. ........................ 359/620; 264/1.32; 427/162

(58) Field of Classification Search ................ 264/1.32, 264/1.38; 359/619, 620; 427/58, 162, 164, 427/165, 166, 167, 299

See application file for complete search history.

(56) References Cited

U.S. PATENT DOCUMENTS

| 5,202,452 | A | 4/1993 | Ogawa et al. |
| 5,800,907 | A | 9/1998 | Yumoto |
| 6,535,338 | B2 * | 3/2003 | Nishikawa .................. 359/619 |
| 6,814,901 | B2 * | 11/2004 | Itoh .......................... 264/1.38 |

(Continued)

FOREIGN PATENT DOCUMENTS

JP    2-262601    10/1990

(Continued)

OTHER PUBLICATIONS

Written Opinion of the International Search Authority (PCT/ISA/237) prepared by the Japanese Patent Office on Apr. 11, 2007 for the international parent (PCT/JP2005/018427) of the instant National Stage application.*

(Continued)

*Primary Examiner*—David N Spector
(74) *Attorney, Agent, or Firm*—Wenderoth, Lind & Ponack, L.L.P.

(57) ABSTRACT

A micro lens includes a base material and a lens formed on the base material, wherein the lens is disposed at an opening on the base material, and the opening is formed by covering a surface of the base material with a first monolayer; and the first monolayer has critical surface energy of 22 mN/m or lower and shows non-affinity for a lens material in comparison with a region within the opening, and is fixed to the surface of the base material via a covalent bind.

10 Claims, 13 Drawing Sheets

U.S. PATENT DOCUMENTS

| | | |
|---|---|---|
| 2002/0145807 A1 | 10/2002 | Nishikawa |
| 2004/0151828 A1 | 8/2004 | Zribi |
| 2004/0163758 A1 | 8/2004 | Kagan et al. |
| 2005/0025880 A1 | 2/2005 | Masuda |
| 2005/0031973 A1 | 2/2005 | Kobayashi et al. |
| 2006/0286461 A1* | 12/2006 | Kim et al. .................... 430/5 |

FOREIGN PATENT DOCUMENTS

| | | |
|---|---|---|
| JP | 4-120082 | 4/1992 |
| JP | 4-190301 | 7/1992 |
| JP | 2001-141906 | 5/2001 |
| JP | 2002-196106 | 7/2002 |
| JP | 2003-98318 | 4/2003 |
| WO | 95/09372 | 4/1995 |

OTHER PUBLICATIONS

G. Gu et al., "High-external-quantum-efficiency organic light-emitting devices", Optics Letters, vol. 22, No. 6, Mar. 15, 1997, pp. 396-398.

* cited by examiner

MICRO LENS, MICRO LENS ARRAY, AND METHOD OF MANUFACTURING THE SAME

TECHNICAL FIELD

The invention relates to a micro lens, a micro lens array, and a method of manufacturing the micro lens.

BACKGROUND ART

As a micro lens comprising a lens formed on a base material or a micro lens array comprising plural lenses formed on the base material, of an optical device, that is made of various materials and has various shapes, besides a micro lens made of an inorganic material such as glass, as a lens material, a micro lens made of resin has been proposed in terms of ease of manufacture and a cost advantage. According to the method of manufacturing the micro lens made of resin, because a lens-forming resin solution is placed on the base material and a hemispherical lens shape is formed due to its surface tension, a base material structure such that suppresses diffusion of the resin solution in the region other than the lens forming region is adopted.

For example, Prior Art 1 (Japanese Unexamined Patent Publication No. JP-A-2-262601) proposes a method comprising: preforming patterns made of a material expelling photosensitive resin as a resin composition for lens on the surface of a transparent base material, and forming lenses by dropping the resin composition for a lens within the patterns surrounded by the expelling portion. Prior Art 2 (Japanese Unexamined Patent Publication No. JP-A-4-190301) proposes a method comprising: forming a patterned masking member made of a sheet of nickel that is non-wettable for a liquid of resin for a lens on a base material, dropping a viscous lens-forming liquid on the surface of the patterns, forming the liquid into a spherical shape due to its surface tension, and forming lenses by solidifying the liquid.

Apart from the foregoing, Prior Art 3 (Japanese Unexamined Patent Publication No. JP-A-2001-141906) proposes a method comprising: forming plural micro lenses on a wettability-variable layer capable of varying wettability of a surface of a base material. According to this method, a photocatalyst-containing layer is formed first across the entire surface of the base material. Energy is then irradiated onto the photocatalyst-containing layer to form regions having different wettabilities in patterns. This forms the structure so as not to diffuse a resin solution to any region other than the lens-forming regions when a resin composition for lens is dropped onto the patterns.

Further, Prior Art 4 (International Publication No: WO95/9372) proposes a method comprising: providing lens-forming division lines on a base material having a contact angle of 15 degrees or higher with respect to lens-forming resin made of resin, such as phenol resin.

According to the foregoing methods for providing a layer of resin matrix to the region other than the lens-forming regions, however, the resin is merely attached to the base material with physical absorption, and thus the adhesion to the base material is weak, which readily gives rise to layer separation in the following treatment steps. It is therefore difficult to form fine lens patterns at a high degree of accuracy when the lens-forming resin is placed on the base material after the resin matrix is formed. In particular, in the case where the resin matrix is made of resist resin, the kinds of lens-forming resin or solutions to disperse the lens-forming resin are limited due to its easy separation, and the selections of the refractive index are also limited.

In addition, when the micro lens as described above is formed, it is preferable to reduce an optical path length to achieve a reduction of the device in size.

From the view point of a reduction of the optical path length, because the wettability-variable layer made of resin is provided on the base material and the lens-forming resin is placed on the layer according to the manufacturing method described in Prior Art 3, the optical path length becomes longer correspondingly to the resin thickness of the layer. Also, the optical design is required to take into account three materials of the base material, the wettability-variable layer and the lens-forming resin, each of which has a different refractive index.

Meanwhile, according to Prior Art 1, 2, or 4, openings are made on the base material by covering the base material with the resin layer only at specific regions, and the lens-forming resin solution is placed at these openings.

However, as is shown in FIG. 13, because a liquid of resin is used even in the case where two or more lenses are isolated by a resin matrix 101 of this kind having openings on a base material 1, the resin matrix 101 becomes as thick as several tens μm to several mm. Hence, when lenses 102 are formed, lens base portions 103 of a size comparable to the depth of the openings become dead volumes and the lens thickness is increased, which consequently makes it impossible to reduce the optical path length.

The problems discussed above become obstacles when fine micro lenses are formed at a high degree of accuracy. A reduction of the device in size requires not only to make the lenses per se finer, but also to lessen the lens thickness; however, it is difficult for the methods proposed in the related art to further lessen the thickness.

As means for solving the problem of the lens thickness as described above, there has been proposed a method for forming a thin-film monolayer on the base material instead of the resin matrix.

For example, Prior Art 5 (US Patent Publication No: US-A1-2005-31973) describes a pattern forming body comprising a base material, a photocatalyst-containing layer formed on the base material, a protection portion formed on the photocatalyst-containing layer, a property variable layer formed to cover both the photocatalyst-containing layer and the protection portion and whose surface property is varied by a function of a photocatalyst due to energy irradiation, and a property-varied pattern that is the property variable layer having its property been varied. The Prior Art 5 describes the application of the pattern forming body to a micro lens.

Also, Prior Art 6 (Patent Publication No: US-A1-2004-163758) describes a method of using a self-assembled patterned monolayer. According to this method, a stamp having a specific pattern with its surface being covered with organic molecules is formed first. Then, the organic molecules are transferred onto a base material by bringing the stamp into contact with the base material, whereby the self-assembled patterned monolayer is formed on the base material. The micro lenses are then formed by forming a thin film in spaces of patterns of this monolayer.

Further, Prior Art 7 (US Patent Publication No:US-A1-2004-151828) proposes a method comprising: forming a photoisomerization layer of a monolayer across the entire surface of the base material, and creating a gradient of surface tension by irradiating light to the photoisomerization layer so as to cause a lens-forming droplet dropped onto the photoisomerization layer to move a desired position.

According to the method described in Prior Art 5, however, the photocatalyst-containing layer is formed across the entire surface of the base material, and the protection portion and the property variable layer are further formed on the photocatalyst-containing layer. Hence, although the property variable layer on the upper layer is a thin film, the overall thickness becomes larger. In addition, because the multi-layer structure is adopted, not only the optical design becomes complex, but also the selections of lens materials are narrowed.

Also, according to Prior Art 6, the monolayer is formed by transferring the organic molecules onto the base material from the surface of the stamp by means of stamp printing. It is therefore necessary to have a large quantity of organic molecules adhere onto the stamp, which makes it difficult to form a monolayer having a uniform thickness. In addition, in the case where highly active organic molecules are used to fix the organic molecules onto the base material, the organic molecules readily react with one another on the stamp. A formed film is likely to be thicker since a large quantity of organic molecules which have lost the activity to bind with the base material are on the base material in a free state. The monolayer thus formed is not fixed sufficiently because of inactivated organic molecules and therefore readily separates from the base material, which makes the non-affinity unsatisfactory. In particular, during the formation of the micro lenses in Prior Art 6, since neither the organic molecules are adhered onto the stamp nor they are transferred onto the base material in an atmosphere to prevent inactivation of the organic molecules as described above, it is likely to be insufficient to form a monolayer having excellent non-affinity for the lens material uniformly.

Further, since the method described in Prior Art 7 requires a step of varying the surface energy of the monolayer after the droplets are placed, it is extremely difficult to control the lens shape to be uniform when a lens array is manufactured.

For any of the methods using the monolayer, it is difficult to place a lens material in a specific shape at a specific position on the base material as the lens is becoming finer. In other words, when a thin-film monolayer fixed onto the base material can be deposited uniformly, the lens thickness may be reduced in some cases; however, as the lens diameter becomes smaller, the lens material diffuses more readily from the specific region at which the lens is disposed. For this reason, problems, such as the occurrence of deformation of the lens shape and a failure to obtain a lens of a specific height become more noticeable.

Further, for a lens array comprising plural lenses formed on the base material, it is preferable to make density higher by narrowing intervals between adjacent lenses as much as possible in achieving efficient use of light. However, as the lens pitch becomes narrower, diffusion of the lens material that occurs when the lens material is placed as described above readily gives influences to the adjacent lenses. The influences between the adjacent lenses in close proximity to each other also make it difficult to obtain a uniform lens array.

DISCLOSURE OF THE INVENTION

The invention has been developed in view of the problems discussed above, and therefore has an object to provide a micro lens having an excellent resistance to separation, capable of reducing an optical path length, and ensuring satisfactory optical characteristics even when the lens is made finer and provided at higher density, as well as a micro lens array and a manufacturing method of the same.

Namely, the invention provides a micro lens including a base material and a lens formed on the base material, wherein: the lens is disposed at an opening on the base material; the opening is formed by covering a surface of the base material with a first monolayer; and the first monolayer has critical surface energy of 22 mN/m or lower, shows non-affinity for a lens material in comparison with a region within the opening, and is fixed to the surface of the base material via a covalent bond.

The invention also provides a micro lens array including the micro lens.

The invention further provides a method of manufacturing a micro lens including a base material and a lens formed on the base material, comprising the steps of: bringing an organic molecule into contact with a region having active hydrogen on a surface of the base material, the organic molecule having a terminal binding functional group capable of forming a covalent bond through a condensation reaction with the active hydrogen at one terminal and a terminal group showing non-affinity for a lens material at the other terminal; forming an opening on the base material by selectively fixing a first monolayer having non-affinity for a lens material to the surface of the base material by forming the covalent bond through the condensation reaction of the terminal binding functional group and the active hydrogen; and forming the micro lens by disposing the lens material at the opening.

BEST MODE FOR CARRYING OUT THE INVENTION

Hereinafter, the invention will be described in details. Each of embodiments below will be described with a micro lens array by way of example, and the micro lens array in each embodiment includes plural micro lenses placed one- or two-dimensionally on a base material. It is therefore readily understood that the invention is also applicable to a case where one micro lens is formed on a base material.

The term, "monolayer", referred to in the invention means a film produced with a monomolecular organic molecule, and it is a film fixed to the surface of the base material via a covalent bond. For the monolayer of the invention, the one comprising a single film (one layer) made of one organic molecule is preferable; however, the monolayer may be a film comprising a laminated body made of two or more organic molecules by layering plural single films. Alternatively, the monolayer is not necessarily limited to one kind, and it is possible to form plural kinds of monolayer that differ in structure, shape, size, non-affinity, and so forth.

First Embodiment

Figure 1:
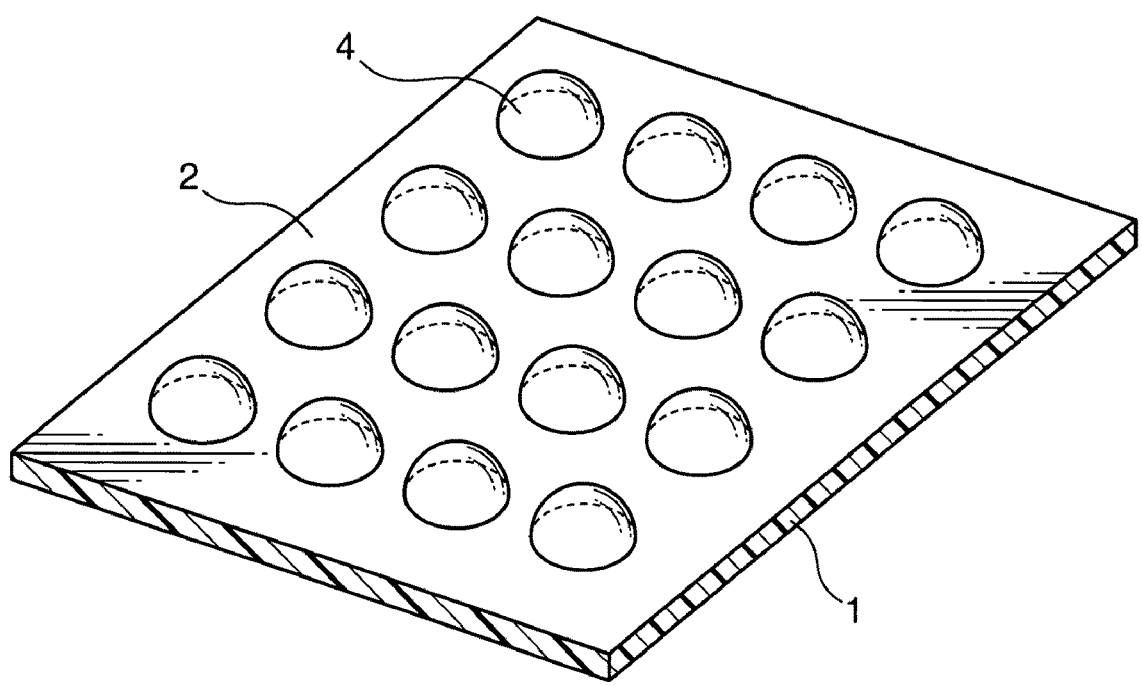
FIG. 1 is a perspective view schematically showing a micro lens array according to a first embodiment of the invention.

FIG. 1 will be referred to describe a micro lens of the invention. All drawings showing the micro lens, including FIG. 1, are illustrated schematically for easy understand of the invention, and thus the size, shapes, and so forth do not reflect those adopted actually.

FIG. 1 is a perspective view showing a micro lens array of the invention. As is shown in FIG. 1, respective lenses 4 are arrayed two-dimensionally on a base material 1. In this embodiment, except for the bottom surfaces of the lenses 4, the entire surface of the base material including the peripheries of the lenses 4 is covered with a first monolayer 2 having non-affinity for a lens material of the lenses 4 in comparison with regions within openings. It may be configured in such a manner as to cover only the periphery of the bottom surface of the opening at which the lens is disposed with the first monolayer 2; however, when the fabrication sequence is concerned, it is advantageous to cover the entire surface of the base material with the first monolayer 2 except for the openings as is shown in FIG. 1.

Figure 2:
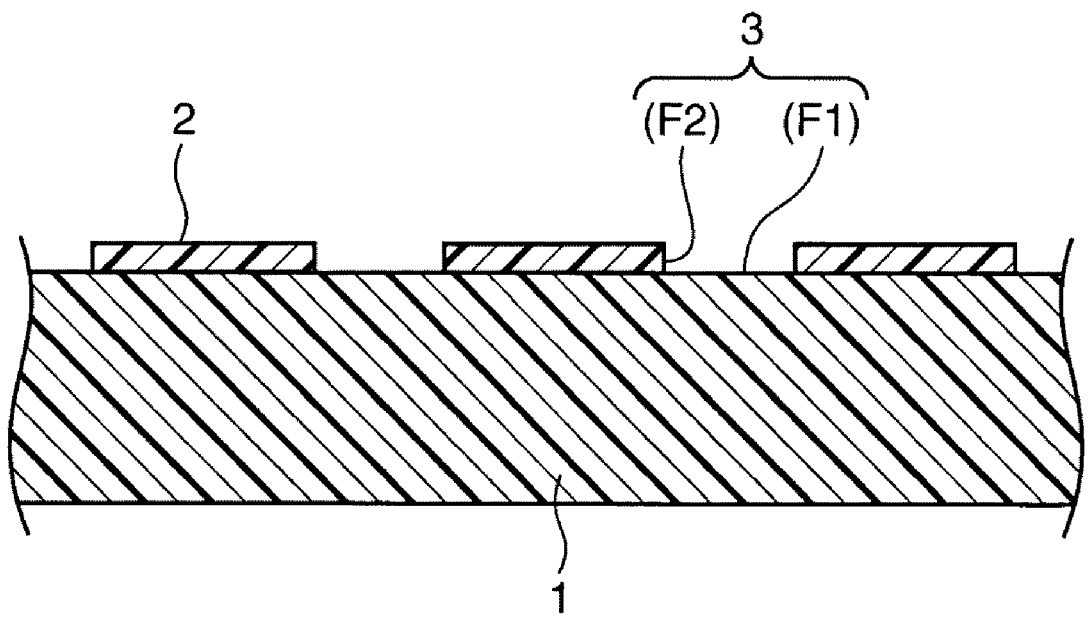
FIG. 2 is a schematic cross sectional view showing a base material on which a first monolayer is formed according to the first embodiment of the invention.

FIG. 2 shows the cross sectional view of the base material, before the lenses are formed according to the first embodiment of the invention shown in FIG. 1. As is shown in FIG. 2, regions at which respective lenses are disposed are formed as openings 3 for forming lenses. The openings 3 are formed by covering the periphery of a bottom surface F1 of each opening 3 with the first monolayer 2 on the surface of the base material 1. Hence, in the region within the opening 3, the bottom surface F1 of the opening 3, on which no first monolayer 2 is formed, shows affinity for the lens material that is different from the affinity of the first monolayer 2 or an inner wall portion F2 of the opening 3.

Figure 3:
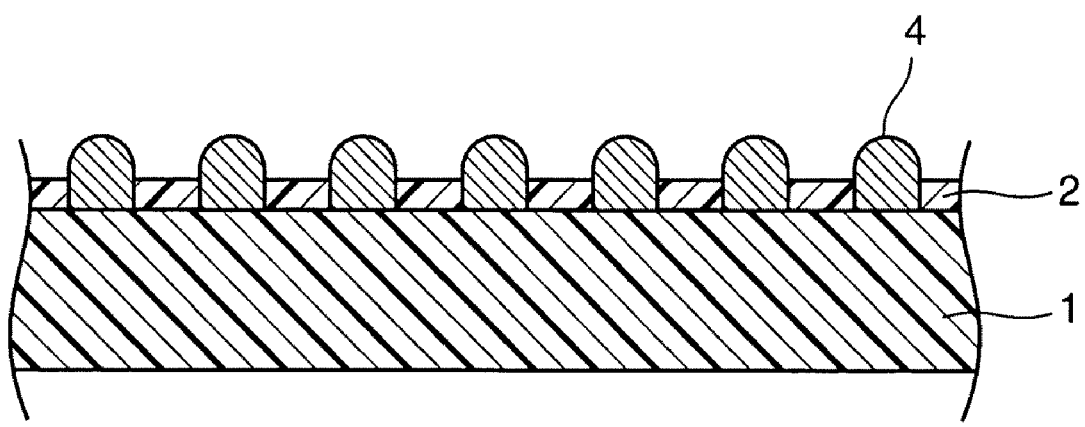
FIG. 3 is a schematic cross sectional view showing the micro lens array according to the first embodiment of the invention.

The opening 3 on drawings is illustrated to have a concave shape in FIG. 2 and FIG. 3; however, because each opening 3 is actually formed by covering the periphery of the bottom surface F1 of the opening 3 with the first monolayer 2 and the first monolayer has a thickness of 30 nm or smaller, the depth of the opening is also of the order of nanometer. A depth formed by the opening 3 is therefore extremely small, and the depth may be sufficiently smaller than a fluctuation of surface roughness of the base material in some cases depending on the kind of the base material 1 used. In addition, because the first monolayer 2 is firmly fixed to the base material 1 by covalent binding, a problem, such as separation, will not occur in the following treatments.

FIG. 3 shows a state where the first monolayer 2 of FIG. 2 is formed in specific patterns and the lens material is accommodated on the base material 1 provided with the openings 3. By covering the periphery of the opening 3, which is the region for forming a lens, with the first monolayer 2 showing non-affinity for the lens material in comparison with the bottom surface F1 of the opening 3 in this manner, the lens material is disposed in a state where it protrudes from the opening edge of the opening 3 in an almost hemispherical shape as a whole or substantially in the shape of a pillar with an almost hemispherical tip end.

Once the lens material is placed at the openings 3, the lens material will not diffuse to the region outside the openings 3 because the first monolayer 2 has critical surface energy of 22 mN/m or lower and lower affinity for the lens material than the regions within the openings 3. The positions on the base material at which the openings 3 are formed are determined arbitrarily by positions covered with the first monolayer 2.

The size of the opening 3, at which the lens is disposed, can be selected appropriately in response to the size of the device used, the optical design, and so forth.

Because the openings are formed by using the first monolayer showing non-affinity for the lens material in comparison with the regions within the openings for the micro lenses of the invention, it is possible to form fine micro lenses whose concave portion has a longitudinal diameter or a long side of 1,000,000 nm (1 mm) or smaller at high density and high definition. Meanwhile, because it becomes difficult to obtain a certain quantity of light when the lens size is too small, the length is preferably 10 nm or larger, and more preferably 50 nm or larger.

A pitch of adjacent lenses in the micro lens array of the invention is preferably 10 nm or larger. Meanwhile, a larger lens pitch is preferable because the influences between the adjacent lenses can be lessened; however, by taking into account that a lens array having high density and high definition is to be formed, it is preferable to set the pitch to 1,000,000 nm (1 mm) or smaller. It should be noted, however, that it is readily understood that the pitch can be larger on the assumption that plural portions that require the micro lens array are placed in the device at predetermined intervals in the form of an island, and the intervals among the insular portions are regarded as the lens pattern intervals.

The lens density of the micro lens array of the invention can be optionally changed in accordance with the device used. It is possible to set the highest density to $2.5 \times 10^{15}$ lenses/m$^2$; however, it is preferable to set the lens density to $1 \times 10^{14}$ lenses/m$^2$ or smaller, and more preferably to $2 \times 10^{12}$ lenses/m$^2$ or smaller.

Subsequently, the first monolayer of the invention will be described.

In the invention, in order to form the first monolayer, a base material having on its surface a characteristic group with active hydrogen of the structure, such as —OH, —NH$_2$, =N—H, a quaternary ammonium ion, —PO$_3$H, —SO$_3$H, and —SH, that binds with an organic molecule, is used. An organic molecule that has a terminal binding functional group capable of forming a covalent bond by reacting with the active hydrogen on the base material at one terminal of a molecular chain and a characteristic group showing non-affinity for the disposed lens material at the other terminal is used. It is preferable to form the first monolayer by bringing such an organic molecule into contact with the base material in a monolayer forming step in which the condensation reaction is allowed to take place.

The base material of the invention can be used known base materials, such as glass substrates, quartz substrates, synthetic quartz substrates, and silicon substrates, as well as substrates made of various polymers, such as acrylic substrates, polystyrene substrates, polyvinyl chloride substrates, epoxy resin substrates, silicone resin (polydimethyl silicone)

substrates, PMMA (polymethyl methacrylate) substrates, and polycarbonate substrates, ceramic substrates, metal substrates. Among them, the glass substrates and the quartz substrates are preferable because they have the structure having many hydroxyl groups on their surfaces. The foregoing base materials may have another base material joined to the bottom.

Further, for the micro lenses of the invention, the base material is not limited to the examples as above, and one layer of the components constituting a light emitting device described later may be used as the base material.

In the base material above, portions other than the active hydrogen on the surface of the base material may be present inside the base material. For example, portions other than the active hydrogen may be present inside the base material and these portions may bind with the constituent elements of the base material. More specifically, for example, in the case where the base material has metal oxides as the constituent material and a characteristic group having active hydrogen is —$PO_3H$, the entire —$PO_3H$ may be exposed from the surface of the base material, or —OH alone of —$PO_3H$ may be exposed. The portion of —$PO_2$— hidden inside the base material may remain in the state of —$PO_2$— per se, or the state of —P—O-$M^1$-, of which oxygen binding with P binds, for example, with a metal atom $M^1$ (metal ion) in a bulk metal oxide.

It is sufficient for the base material to have active hydrogen when the first monolayer is formed. In other words, the base material does not necessarily have sufficient active hydrogen to form a monolayer previously, and it may be a base material to which active hydrogen is provided before the monolayer forming step.

The covalent bond formed by the condensation reaction between the active hydrogen and the terminal binding functional group in the organic molecule described below is preferably at least one covalent bond selected from the group consisting of M-O, M-N, and M-S bonds (M is Si, Ti, Al or Sn), depending on the structure of the characteristic group having active hydrogen present on the base material and the kinds of organic molecule used as a raw material of the first monolayer. Among them, in terms of ease of manufacture, a bond including at least one kind of structure selected from the group consisting of Si—O, Si—N, and Si—S bonds is preferable, Si—O and Si—N bonds are more preferable, and a Si—O bond is most preferable.

In the invention, the first monolayer is formed by allowing the active hydrogen on the base material to react with an organic molecule represented by General Formula (1) below or a derivative thereof.

(1)

where x is an integer from 1 to 3, y is an integer from 0 to 2, x+y is 3; $C_bL_{2b}$ is a straight chain or a branched chain, L is H or F, and b is an integer from 2 to 24; Z is one element selected from Si, Ti, Al and Sn; D is one characteristic group selected from halogen, $OCH_3$, $OC_2H_5$, and OCN; E is one characteristic group selected from the group consisting of hydrogen, $CH_3$, $C_2H_5$, and $C_3H_7$; and q is an integer from 1 to 3, r is an integer from 0 to 2, q+r is 3.

In the case where the internal characteristic group, (—$C_bL_{2b}$-), has the branch structure, the number of terminals in the organic molecule is 3 or greater; however, for the organic molecule having such a branch structure, it is sufficient that at least one terminal excluding the terminal binding functional group, (-Z-$D_qE_r$), has a terminal group, ($CF_xH_y$—). Also, as an example of the derivative of the organic molecule of the invention represented by General Formula (1) above, an organic molecule of the structure further having another characteristic group between the terminal group and the internal characteristic group, (—$C_bL_{2b}$-) is exemplified. For such a characteristic group, a characteristic group represented by Formula (2) below is preferable.

(2)

In the invention, in order to form the first monolayer having an excellent molecular orientation, the organic molecule having a straight chain is preferably. Regarding a molecular chain length, an organic molecule having two or more carbons in the internal characteristic group, (—$C_bL_{2b}$-), in the straight chain portion is preferable, and the one having nine or more carbons is more preferable. Meanwhile, the molecular orientation is reduced when the characteristic group has too many carbons, and there is a tendency that it becomes difficult to obtain desired critical surface energy necessary to prevent diffusion of the lens material. It is therefore preferable to have 17 or less carbons in the internal characteristic group, (—$C_bL_{2b}$-).

Because the first monolayer is formed on the base material by allowing such an organic molecule and the base material to undergo covalent binding, the film thickness of the monolayer is 30 nm or smaller. From this point of view, the invention is remarkably different from the known resin matrix having a film thickness of at least the order of micrometer. The first monolayer may be a monolayer comprising a single layer made of the organic molecule as described above, or a monolayer comprising two or more layers in which two or more organic molecules are layered. In this case, the film thickness of the single-layer monolayer is preferably in a range of 0.5 to 3.4 nm. It should be noted, however, that a possibility of impairing the molecular orientation becomes higher as the film thickness increases as the result of lamination. Hence, taking such a possibility into account, the film thickness is preferably 30 nm or smaller and the lower limit is preferably 1 nm or larger.

The thickness of the monolayer of the invention is the value measured by: preparing a thin piece having a thickness of 100 nm with an ultramicrotome after embedding a base material covered with a monolayer in epoxy resin, and then observing a sample, that is applied surface treatment by means of argon ion etching to the prepared thin piece, with a transmission electron microscope (H-9000UHR available from Hitachi, Ltd.,) at an acceleration voltage of 300 kV and a magnification of one million times.

In the invention, of the first monolayers obtained by the condensation reaction between the active hydrogen on the surface of the base material and the organic molecule as described above, the one having critical surface energy of 22 mN/m or lower, and preferably 18 mN/m or lower is used. In the case where the critical surface energy of the first monolayer is higher than 22 mN/m, even the first monolayer showing non-affinity for the lens material in comparison with the regions within the openings tends to be insufficient to prevent diffusion of the lens material when the lens material is placed at the openings. When a high-density micro lens array is formed, because the lens pitch becomes narrower, diffusion of the lens material gives influences on the formation of the adjacent lenses, which makes it difficult to obtain a uniform micro lens array at high definition. Taking the kinds of organic molecule used into account, the critical surface energy of the first monolayer is preferably 5 mN/m or higher.

To form the first monolayer having such critical surface energy, of the organic molecules specified above, it is preferable to use an organic molecule having a perfluoroalkyl group as the terminal group, ($CF_xH_y$), at one terminal, a —Si-$D_3$ (D is halogen) as the terminal binding functional group, (-Z-$D_qE_r$), at the other terminal, and 9 to 17 carbons in the internal characteristic group, (—$C_bL_{2b}$-), under a low humidity atmosphere in the monolayer forming step.

A monolayer preferably used as the first monolayer of the invention is the one that can obtain a large difference of critical surface energy from the lens material used. A difference of critical surface energy between them is preferably 12 mN/m or greater, and more preferably 20 mN/m or greater. A larger difference is preferable because the non-affinity for the lens material can be higher. Meanwhile, from the view point of selection of the lens materials, a difference of critical surface energy is preferably 67 mN/m or lower.

The critical surface energy of the invention is measured by the following method. Initially, 4 µL of plural kinds of wetting index reference solutions (available from Nakaraitesk Company) is dropped to six different positions on a measurement sample at room temperature, and an average value of contact angles (static contact angles measured by a contact angle meter available from Kyowa Interface Science Co., Ltd.) of respective droplets is measured. The X axis is used for a cosine value of the contact angle and the Y axis is used for energy of the reference solution. The measured contact angles and energy of the respective reference solutions used are then plotted, and the value when the cosine value is extrapolated to 0 is defined as critical surface energy. In the case where measurement on the plane is difficult, for example, in the case where a subject to be measured is a lens having curves, the measurement is performed using a planar sample made of the same material.

A difference of the critical surface energy above can be controlled by the kinds of lens material and characteristic group in the terminal of the first monolayer, and preferable combinations are as follows. For example, in the case where an organic molecule having a $CF_3$ group as the characteristic group at the terminal showing non-affinity for the lens material is used, resin materials, such as polyurethane resins, polyethylene terephthalate, polymethyl methacrylate, polypropylene, and polyamide oligomers, are used as suitable lens materials.

By using a combination of the first monolayer and the lens material showing a difference of the critical surface energy as specified above, it is possible to suppress diffusion of resin in the lens forming step and to obtain lenses that are uniform not only in shape, but also in size, such as a lens diameter and a lens thickness.

In the invention, of the organic molecules or derivatives thereof represented by General Formula (1), organic molecules represented by (101) through (127) below are preferable in terms of ensuring the uniformity of the monolayer sufficiently and ensuring molecular density of organic molecules that are arrayed when the monolayer is formed.

$CF_3(CF_2)_7(CH_2)_2SiCl_3$ (101)

$CF_3(CH_2)_9SiCl_3$ (102)

$CH_2F(CH_2)_9SiCl_3$ (103)

$CF_3(CF_2)_4(CH_2)_2SiCl_3$ (104)

$CF_3(CF_2)_6SiCl_3$ (105)

$CH_3(CH_2)_9SiCl_3$ (106)

$CH_3(CH_2)_5SiCl_3$ (107)

$CH_3(CH_2)_6SiCl_3$ (108)

$CF_3(CF_2)_7(CH_2)_2Si(OCH_3)_3$ (109)

$CH_3(CH_2)_9Si(OCH_3)_3$ (110)

$CF_3(CF_2)_6Si(OCH_3)_3$ (111)

$CF_3(CF_2)_7(CH_2)_2SiBr_3$ (112)

$CH_3(CH_2)_9SiBr_3$ (113)

$CF_3(CF_2)_6SiBr_3$ (114)

$CF_3(CF_2)_7(CH_2)_2Si(OCN)_3$ (115)

$CH_3(CH_2)_9Si(OCN)_3$ (116)

$CF_3(CF_2)_6Si(OCN)_3$ (117)

$CF_3(CF_2)_7(CH_2)_2SiH_2Cl$ (118)

$CH_3(CH_2)_9SiH_2Cl$ (119)

$CF_3(CF_2)_6SiH_2Cl$ (120)

$CF_3(CF_2)_7(CH_2)_2Si(CH_3)_2(OCH_3)$ (121)

$CH_3(CH_2)_9Si(CH_3)_2(OCH_3)$ (122)

$CF_3(CF_2)_6Si(CH_3)_2(OCH_3)$ (123)

$CF_3(CF_2)_2(CH_2)_2Al(OC_2H_5)_3$ (124)

$CH_3(CH_2)_4SnCl(C_3H_7)_2$ (125)

$CF_2H(CF_2)_2(CH_2)_2SiH_2Cl$ (126)

$CF_3(CF_2)_7(CH_2)_2TiCl(CH_3)_2$ (127)

$CF_3(CH_2)_2(CH_3)_2Si(CH_2)_{15}SiCl_3$ (128)

$CF_3(CF_2)_3(CH_3)_2Si(CH_2)_9SiCl_3$ (129)

$CF_3(CF_2)_7(CH_2)_2(CH_3)_2Si(CH_2)_9SiCl_3$ (130)

Examples of the organic molecules as specified above include a silane coupling agent available from Shin-Etsu Chemical Co., Ltd., a silane coupling agent available from GE Toshiba Silicones, organic silicon available from Chisso Corporation, a silane coupling agent available from Dow Corning Toray Co., Ltd., and specialty chemicals available from AZmax Co.

Subsequently, a method of manufacturing the micro lens of the invention using the base material and the organic molecule as specified above will be described.

The first monolayer is formed by bringing the organic molecule into contact with the base material having active hydrogen as has been described. This contact treatment can be performed in either a gas phase or a liquid phase; however, the liquid phase treatment is preferable in terms of ease of manufacture.

The liquid phase treatment is performed by bringing an organic-molecule-containing liquid, in which the organic molecule is dissolved into or suspended in a solvent, into contact with the base material. Since the organic molecules as specified above are more readily hydrolyzed as the terminal binding functional group at the side binding with the base material becomes more active, which allows the terminal binding functional groups to undergo self condensation to form a condensate, an aprotic solvent is used. In the case where a protic solvent, such as alcohol, is used, the terminal binding functional group disappears before it comes into contact with the surface of the base material due to condensation taking place in the solution, which makes it difficult to form the monolayer.

In order to obtain the first monolayer having the critical surface energy as specified above, in the phase-liquid treatment, a moisture content represented by a relative humidity value (converted to a relative humidity value at 22° C.) in a gas phase that is in contact with the organic-molecule-containing liquid is preferably 35% or lower, and more preferably 25% or lower, and further preferably 5% or lower. By performing the liquid phase treatment in a low humidity atmosphere as above, the condensation reaction between the active organic molecules can be suppressed. It is thus possible to obtain homogenous critical surface energy across the entire region in which the first monolayer is formed.

A hermetic system, such as a glove box, is preferable as a reaction vessel used in the step described above. As a gas component constituting the gas phase having a moisture content adjusted to be in the range specified as above, at least one kind of gas selected from the group consisting of a noble gas and nitrogen gas is preferable.

The first monolayer is formed by the contacting step as described above, and an example of a preferred method of forming openings in this step is as follows.

A specific resist pattern is formed on the base material first to cover regions that will be made into the bottom surfaces of the openings. By bringing the base material after the resist pattern is provided into contact with the organic molecule, the regions having no resist are selectively covered with the first monolayer. The openings are formed by removing the resist pattern subsequently. The resist pattern may be either a positive-type resist pattern or a negative-type resist pattern.

In the case where the base material provided with the resist pattern in the step described above is brought into contact with the organic molecule, the liquid phase treatment is performed in an atmosphere adjusted to be at the low humidity as specified above.

In the invention, an aprotic solvent used to prepare the organic-molecule-containing liquid is determined in accordance with the kinds of organic molecule as long as the aprotic solvent does not dissolve the resist pattern. For example, a fluorine solvent is preferable in terms of obtaining a monolayer having a thin film thickness and an excellent uniform film thickness with ease in a reliable manner. A perfluoro carbon liquid and a hydrofluoro ether liquid available from Sumitomo 3M Ltd. can be used preferably as such a fluorine solvent. For example, those available under the trade names HFE-7200, PF-5080, and FC-77 from Sumitomo 3M Ltd. can be used. Although the concentration of the organic molecule in the organic-molecule-containing liquid is not particularly limited, for example, about $10^{-4}$ mol/L or higher is preferable, and $10^{-3}$ mol/L or higher is more preferable. About $10^{-1}$ mol/L is preferable as the upper limit. A contact time of the base material and the organic-molecule-containing liquid is not particularly limited, either; however, it is preferably several seconds to ten hours, and more preferably one minute to one hour. The temperature of the organic-molecule-containing liquid is, for example, in a range of 10 to 80° C., and preferably 20 to 30° C.

Also, it is necessary to adjust a moisture content in the gas phase contacting to the solvent to be in the range specified above while the organic-molecule-containing liquid is prepared.

After the first monolayer is formed, the resist pattern is removed using, for example, acetone.

Although the method of forming the monolayer on the base material after the resist pattern is formed in the liquid phase is not particularly limited to the method described above, methods, such as screen processing, the liquid ejection method, the ink jet method and the like, can be adopted.

By the steps described above, the openings covered with the first monolayer at the peripheries are formed on the base material.

In the invention, the shape of the bottom surface of the opening is adjusted in accordance with a desired lens shape. More specifically, for example, the bottom surface of the opening may have not only circular shape, but also a rectangular concave shape.

Subsequently, the lens material that shows non-affinity for the first monolayer in comparison with the regions within the openings is placed at the openings on the base material.

In the invention, the lens material is not limited to light transmitting resin, and an inorganic material, such as glass, can be used as well. A material of resin can be thermosetting resin or energy line curable resin. The energy line can be UV rays, visible light, electronic rays, X rays, and so forth. A main component of the foregoing resin may be a high molecular material or a low molecular material. Examples of the high molecular material include epoxy resins, urethane resins, polyester resins, polyether resins, silicone resins, polycarbonates, polymethyl methacrylate, methyl phthalates, polyethylene terephthalate, polystyrenes, diethylene glycol, bis-allylcarbonates, acrylonitrile, styrene copolymers, copolymers of methyl methacrylate and styrene, polypropylene, and derivatives of the foregoing. Examples of the low molecular material include polyamide oligomers, acrylic monomers, unsaturated polyester oligomers, polyacrylic oligomers, enthiol monomers, alkylpolysiloxane oligomers, and derivatives of the foregoing.

The micro lenses are formed by forming into hemispherical droplets due to the surface tension when such a lens material is placed at the openings.

According to the invention, lenses of various shapes, such as spherical lenses and low-thickness lenses, can be formed. The volume of the lens is preferably $1 \times 10^{-25}$ to $3 \times 10^{-10}$ m$^3$, and more preferably $3 \times 10^{-19}$ to $3 \times 10^{-16}$ m$^3$.

In the invention, when the micro lenses are disposed at the openings, the lens material is readily placed at the openings alone by dipping the base material, on which the specific first monolayer has been formed, in a solution containing the lens material and pulling out the base material from the solution. In other words, the base material has low critical surface energy and shows non-affinity for the lens material in the regions on which the first monolayer is formed, and the fixation of the lens material is suppressed on these regions, thereby allowing the lens material to be placed only at the regions where the openings are positioned. Hence, even in the method of placing the lens material by means of dipping, the step of removing the undesired lens material from the base material can be omitted. The lens material placed at the openings forms an almost hemispherical shape or takes substantially the shape of a pillar with an almost hemispherical tip end due to surface tension. Besides the dipping method as described above, bar coating or spin coating can be used as well.

In the invention, in the case where accurate placement is difficult because of the viscosity of a solution of the lens material or the degree of non-affinity of the first monolayer for the lens material, a method of ejecting a controlled quantity of lens material can be adopted. For example, dropping using a dropper, dropping using a dispenser, and dropping by the ink jet method are available.

In the case of the method capable of controlling a quantity of dropped lens material through the use of the ink jet method or by means of dispensing, it is possible to form a lens of a shape as large as or larger than a hemisphere or a lens of a shape as large as or smaller than a hemisphere. In order to form the shape as large as or larger than a hemisphere, for example, an almost complete spherical shape, it is more preferable for the first monolayer to have higher non-affinity for the lens material. In addition, it is preferable to provide repetitive patterns of pits and projections (height: 100 nm to 1 μm, width: 10 to 100 nm) having a height of the order of nanometer on the surface of the base material previously, and then to form the first monolayer having high non-affinity on the surface.

The solvent used as a solution of the lens material is not particularly limited as long as the solvent can dissolve or suspend the lens material. It should be noted, however, that it is preferable for the manufacture of lenses to use a solvent to which the lens material shows a high solubility in increasing the volume of the lenses disposed at the openings. Also, a highly volatile solvent having a low boiling point is preferable to remove the solvent from the solution of the lens material with ease.

The concentration of the lens material in the solution is preferably 20% by mass or higher for convenience of manufacture. However, even when the concentration is lower than 20% by mass, desired lenses can be formed by supplying a solution containing the lens material several times.

After the lens materials is placed at the openings as has been described, the micro lenses are formed by providing the curing step as needed. For example, preferable curing conditions when polyester resin is used as thermosetting resin are as follows: the curing temperature is 140 to 150° C. and the curing time is 10 to 30 minutes. When epoxy resin is used as photo curable resin, a UV lamp or the like is used as an irradiation source for curing to take place. The irradiation condition is, for example, 400 mJ/cm$^2$. Heat treatment (for example, 70° C. for 120 minutes) may be performed additionally. When an inorganic material, such as silicate glass, is used as the lens material, for example, a method, by which a sol-gel solution is prepared by adding water, alcohol or the like to alkoxy silane material with stirring for the sol-gel solution to be placed at the openings followed by heat treatment, is adopted.

Second Embodiment

To manufacture the micro lens of the invention, a method different from that in the first embodiment may be adopted for forming the opening. An example of such a method may be a step in which, after the first monolayer is formed, part of the formed first monolayer is removed by irradiation of energy for the opening to be formed selectively on the base material.

Different from the first embodiment, the resist pattern is not used in this method. Hence, any solvent capable of dissolving the organic molecule can be used without any particular limitation as the aprotic solvent used when preparing the organic-molecule-containing liquid. For example, organic solvents, such as hexadecane, chloroform, carbon tetrachloride, silicone oil, hexane, and toluene, can be used. One kind or a mixture of two or more kinds of these solvents can be used.

Among them, a mixed solvent containing hexadecane, chloroform, and carbon tetrachloride is preferable as the aprotic solvent. With the use of such an organic solvent, for example, polymerization of the organic molecule through the mediation of moisture can be prevented in a satisfactory manner. This allows the terminal binding functional group of the organic molecule and the active hydrogen on the base material to undergo a condensation reaction efficiently. The organic molecule binds with the base material via a covalent bond (for example, a siloxane bond (—Si—O—)) as the result of this condensation reaction, and the monolayer is consequently formed. The condensation reaction takes place under the environment at the relative humidity value specified above.

A photo-mask is supplied onto the formed first monolayer for protection from energy irradiated thereto. The photo-mask is of the structure by which when it is disposed in a space between the light source of UV rays and the base material on which the first monolayer has been formed, UV rays are irradiated selectively to the first monolayer only at portions covering the regions that will be made into the openings on the base material. Subsequently, UV rays are irradiated to the base material on which the first monolayer has been formed via the photo-mask for the first monolayer to be removed selectively only at portions covering the regions that will be made into the openings. The openings are thus formed on the base material. Because the surface of the base material is exposed, the first monolayer shows non-affinity for the lens material in comparison with the regions within the openings.

When a laser, such as the excimer laser and the pulse laser, is used as means for irradiating UV rays, it is possible to adopt a method by which a spot of UV rays is irradiated onto a particular region of the first monolayer without using the photo-mask. Further, instead of irradiating UV rays, it is possible to adopt a method of removing the first monolayer only at portions covering the regions that will be made into the openings by electron irradiation treatment, corona treatment, and plasma treatment. It is preferable to perform these treatments in the presence of oxygen.

Third Embodiment

In a manufacture of the micro lens of the invention, when a quantity of active hydrogen on the surface of the base material on which the first monolayer is to be formed is insufficient, it is preferable to provide an active hydrogen providing step before the monolayer forming step. By providing such a step, a selection range of the base materials can be broadened.

Examples of a method of providing active hydrogen to the base material include a method of subjecting the surface of the base material to a chemical oxidation treatment, a method of applying plasma treatment in the presence of oxygen, a method of performing ozone treatment or the like. Alternatively, there is a method of subjecting the base material to a hydrophilization treatment using, for example, $SiCl_4$, $HSiCl_3$, $SiCl_3O—(SiCl_2—O)_u—SiCl_3$ (where u is an integer from 0 to 6), $Si(OH)_4$, $HSi(OH)_3$, and $Si(OH)_3O—(Si(OH)_2—O)_u—Si(OH)_3$ (where u is an integer from 0 to 6).

Hereinafter, a method of subjecting the surface of the base material to the oxidation treatment will be described concretely. The oxidation treatment is performed by irradiating energy to the surface of the base material in the presence of oxygen and a substance supplying hydrogen atoms. For example, oxygen in the gas phase is decomposed by irradiation of UV rays and ozone is produced. The ozone reacts with the substance supplying hydrogen atoms to produce active species having active hydrogen. By irradiating UV rays onto the surface of the base material, covalent bonds among atoms of the materials constituting the vicinity of the surface are cut and dangling bonds are formed. The base material having active hydrogen is obtained as the active species containing active hydrogen act on the dangling bonds. As a device used for the oxidation treatment, a UV ozone treatment device or an excimer UV irradiation device is effective.

Examples of a preferred substance supplying hydrogen atoms include water, ammonia or the like. For example, when water is used as the substance supplying hydrogen atoms, active hydrogen is provided to the surface of the base material as a characteristic group including at least the structure expressed by —OH. Also, when ammonia is used as the substance supplying hydrogen atoms, active hydrogen is provided to the surface of the base material as a characteristic group including at least the structure expressed by —NH. Corona treatment, plasma treatment, or the like may be adopted instead of UV irradiation treatment.

Further, a layer having active hydrogen or a characteristic group containing active hydrogen may be provided to the surface of the base material made of resin by means of plating, vapor deposition, CVD or the like.

The base material provided with active hydrogen as has been described can be used to manufacture the micro lens by the same method as in the first embodiment.

Fourth Embodiment

It is also preferable as one embodiment of the micro lenses of the invention to change the height of the lens by changing the degree of non-affinity of the first monolayer that forms the inner wall of the opening with respect to the lens material.

Figure 4A:
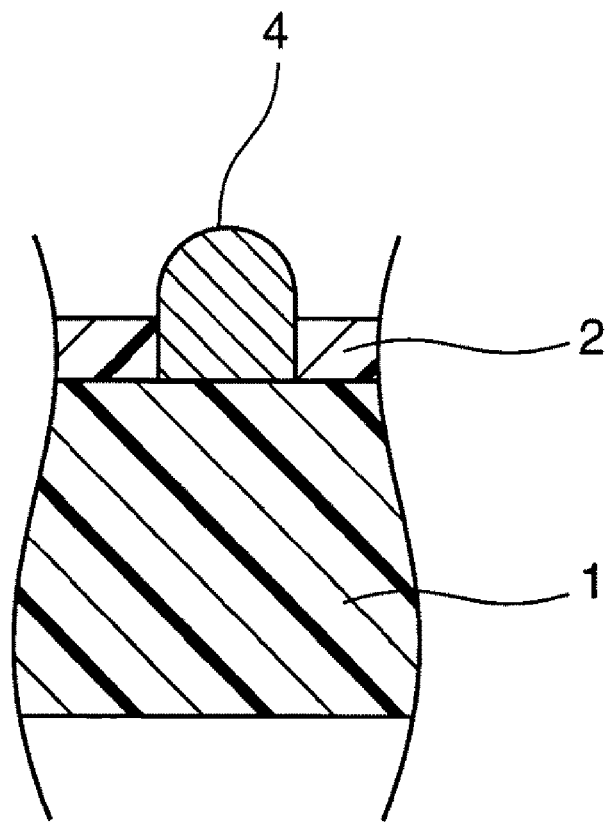
FIG. 4A and FIG. 4B are schematic cross sectional views showing micro lenses to describe lens shapes resulted from a difference of non-affinity between the first monolayer and the lens material according to a fourth embodiment of the invention.
Figure 4B:
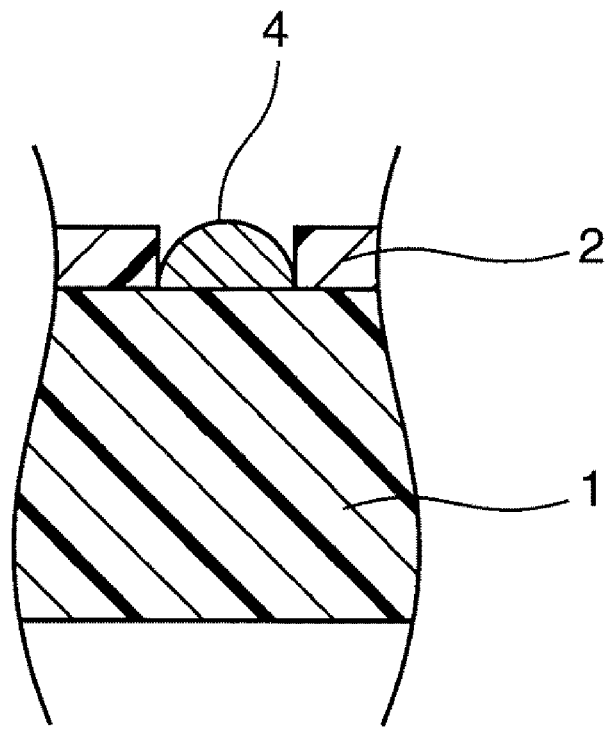

In other words, as are shown in FIG. 4A and FIG. 4B, the height of the lens base portion is changed by changing the degree of non-affinity of the first monolayer forming the inner wall of the opening formed in the first embodiment with respect to the lens material. FIG. 4A shows a case where the inner wall of the opening comprises the first monolayer that is made of an organic molecule having relatively good affinity for the lens material. FIG. 4B shows a case where the inner wall of the opening comprises the first monolayer made of an organic molecule repellent to the lens material. The embodiment of FIG. 4B is particularly preferable because the height of the lens base portion is substantially 0.

The embodiment of FIG. 4A is an example of a case where a lens material, such as silicone resin, polypropylene resin, and polystyrene resin, is placed at the openings formed with the use of the organic molecule represented by Formula (102) above.

The embodiment of FIG. 4B is an example of a case where a lens material, such as urethane resin, polyester resin, silicone resin, and polyether resin, is placed at the opening formed with the use of the organic molecule represented by Formula (101) above.

Fifth Embodiment

It is preferable as one embodiment of the invention to form a second monolayer showing affinity for the lens material in the region within the opening.

Figure 5:
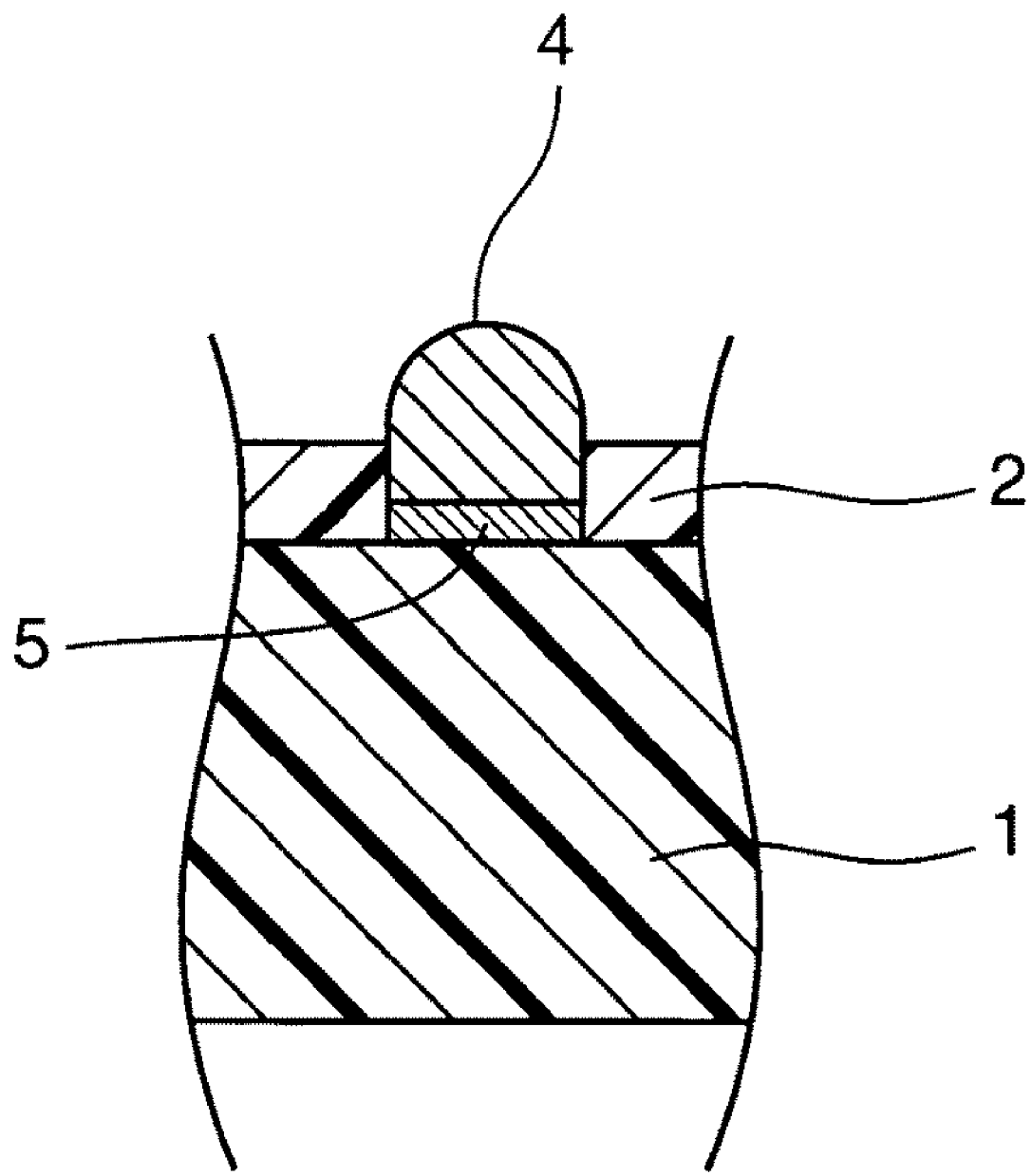
FIG. 5 is a schematic cross sectional view showing a micro lens according to a fifth embodiment of the invention.

As is shown in FIG. 5, opening is provided by forming the first monolayer 2 showing non-affinity for the lens material on the base material in this embodiment. Further, a second monolayer 5 showing affinity for the lens material is formed in the region within the opening. It is preferable because a difference of affinity for the lens material between the region within the opening and the first monolayer 2 having non-affinity and formed on the periphery of the opening becomes larger by forming the second monolayer 5 showing affinity for the lens material in the region within the opening. Also, it is preferable because the lens material is chemically bound with the second monolayer 5 and the lens material is firmly fixed within the opening.

The second monolayer has a functional group having high wettability to the lens material on the surface and is therefore formed to enhance the fixity of the lens material when the lens material is placed. Hence, those having critical surface energy as high as that of the lens material as specified above are preferably used. In particular, a difference of critical surface energy between the lens material and the second monolayer is preferably smaller than 12 mN/m. In the case where the opening is so small that it is difficult to directly measure the critical surface energy of the second monolayer formed within the opening, a planer plate made of the same material is used for measurement.

In this embodiment, in the case where resin is used as the lens material, when the terminal binding functional group and the active hydrogen on the base material make a covalent bond, an organic molecule having a functional group showing affinity for the lens material is used at the other terminal. The kinds of functional group depend on the kinds of resin used. For example, in the case where polyurethane resin (critical surface energy: about 38 mN/m) is used as the lens material, an organic molecule having a $CCl_2H$— group at the terminal, for example, $CCl_2H(CH_2)_8SiCl_3$ (critical surface energy: about 39 mN/m), is used.

In the case where polyamide (critical surface energy: about 42 mN/m) is used as the lens material, an organic molecule having a $CCl_2$=H— group at the terminal, for example, $CCl_2$=$CH(CH_2)_8SiCl_3$ (critical surface energy: about 43 mN/m), is used.

Examples of the organic molecules showing affinity for the foregoing resin include organic molecules represented by General Formulae below.

$$CH_2=CH(CH_2)_vSiCl_3 \quad (201)$$

$$NC(CH_2)_vSiCl_3 \quad (202)$$

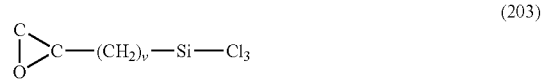

(203)

$$C_6H_5(CH_2)_vSiCl_3 \quad (204)$$

[where v in Formulas (201) through (204) is an integer from 2 to 22.]

Further, besides the organic molecules specified above, examples of the organic molecules that can be used to form the second monolayer in this embodiment include organic molecules as follows.

$$H_2N(CH_2)_3Si(OCH_3)_3 \quad (301)$$

$$OHC(CH_2)_3Si(OCH_2CH_3)_3 \quad (302)$$

$$HOOC(CH_2)_5Si(OCH_3)_3 \quad (303)$$

$$HO(CH_2)_5Si(OCH_3)_3 \quad (304)$$

$$H_3COOC(CH_2)_5Si(OCH_2CH_3)_3 \quad (305)$$

$(OH)_2OP(CH_2)_3Si(OCH_3)_3$ (306)

$HO_2S(CH_2)_3Si(OCH_3)_3$ (307)

$HS(CH_2)_3Si(OCH_3)_3$ (308)

$CH_2=CH(CH_2)_6Si(OCH_3)_3$ (309)

$CH_3C_6H_4Si(OCH_3)_3$ (310)

$ClCH_2C_6H_4Si(OCH_3)_3$ (311)

The organic molecules as specified above are available in the form of compounds as the organic molecules used when forming the first monolayer.

It is preferable that the film thickness of the second monolayer is smaller than the film thickness of the first monolayer. Hence, regarding the molecular chain length of the organic molecule forming the second monolayer, the organic molecule having a molecular chain length shorter than that of the organic molecule used to form the first monolayer is used.

The second monolayer is formed by the same method as the method of forming the first monolayer. In a manufacture of the micro lenses of this embodiment, the openings are provided by forming the first monolayer on the base material first and thence the second monolayer is formed within the openings; or the second monolayer is formed on the base material in advance and thence the first monolayer covers the other regions on the surface of the base material. In this instance, in order to fix the lens material placed at the openings, it is necessary not to form the second monolayer in regions where lenses need not to be formed. Hence, when the second monolayer is formed, it is preferable to cover the regions where the lenses need not to be formed with the resist or the like as in the case of forming the first monolayer. In the case where the first monolayer having repellence to the resist is formed first, it is preferable to improve adhesion to the resist by exposing the base material on which the first monolayer has been formed as desired to a vapor of hexamethyl disilazane.

Sixth Embodiment

The micro lens of the invention may use one of the components of a light emitting device as the base material. When such a base material is used, the micro lens can be formed inside the light emitting device. The optical characteristic can be therefore improved without changing the size of the device significantly.

Figure 6:
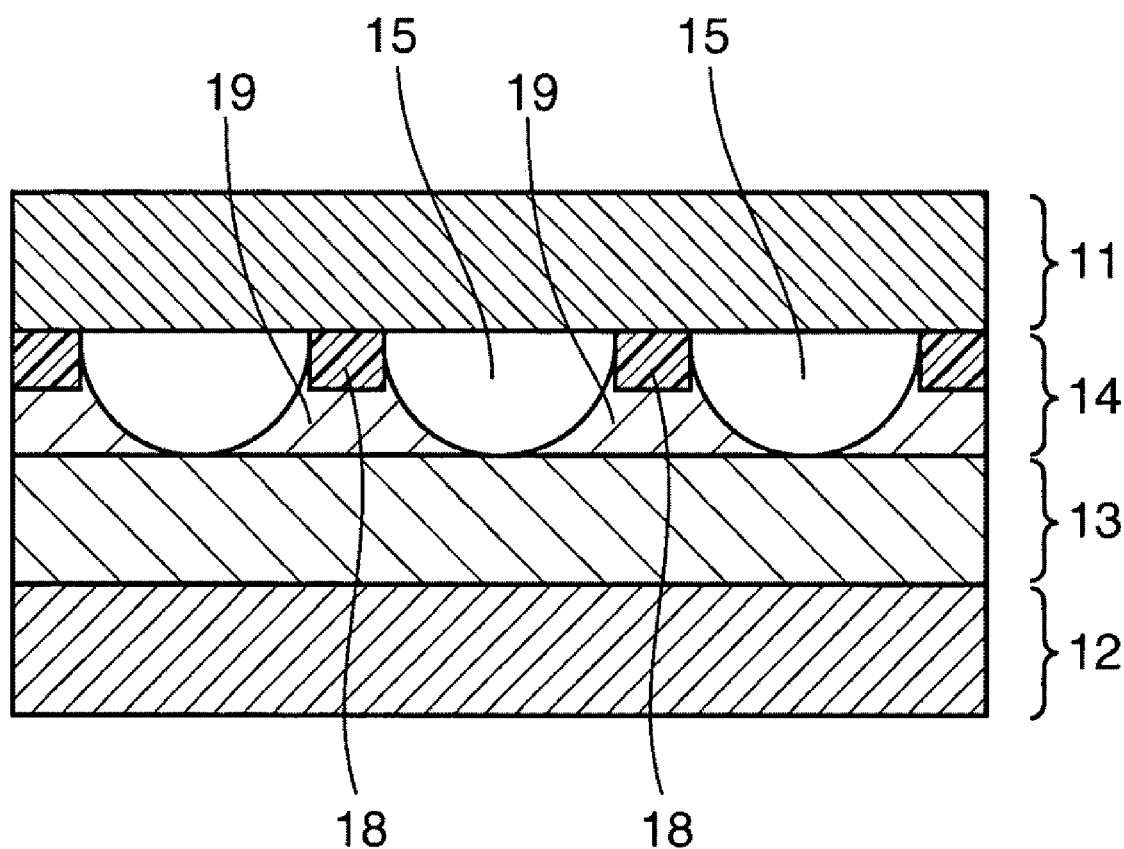
FIG. 6 is a schematic cross sectional view showing the basic configuration of a light emitting device according to a sixth embodiment of the invention.

FIG. 6 is cross sectional schematic view showing the basic configuration of a light emitting device (organic EL) as one example of the light emitting device using the micro lens of the invention.

The light emitting device shown in FIG. 6 includes a transparent electrode 11 formed on a transparent substrate (not shown), a counter electrode 12, a luminous layer 13, and a light extracting layer 14. The light extracting layer 14 includes the micro lenses of the invention. The transparent electrode 11 and the light extracting layer 14 have the capability of transmitting light emitted from the luminous layer 13, and the counter electrode 12 has the capability of either reflecting or transmitting light emitted from the luminous layer 13.

The electrode of the light emitting device comprises the transparent electrode 11 and the counter electrode 12 that function as the anode and the cathode, respectively. In this embodiment, known materials are used as an anode material and a cathode material.

Metals having a small work function and alloy and oxides containing such metals are used as the cathode material. Specifically, examples include an alkali metal, such as sodium and lithium, or alloy thereof (for example, aluminum-lithium alloy). Examples also include a metal of alkaline earth, such as calcium and magnesium, or alloy thereof (for example, magnesium-indium alloy). Alloy is made of the foregoing metals, aluminum, silver, indium, and so forth. Further, a part of the third group metals, such as gallium and indium, may be used.

Metals and alloy having a large work function can be used as the anode material. Specifically, examples include indium tin oxide alloy (ITO), indium zinc oxide alloy (IZO), indium oxide, tin oxide, gold, copper iodide, and derivatives thereof.

A low molecular organic compound, a dendrimer, a high molecular compound, and so forth can be used as a material of the luminous layer 13. Specifically, examples include complexes of aluminum and quinolinol, complexes of beryllium and benzoquinolinol, oxadiazole derivatives, triazole derivatives, quinacridone derivatives, perylene compounds, diphenyltetracene, rubrene, europium complexes, platinum porphyrin complexes, iridium complexes, polyparaphenylene vinylene derivatives, polyphenylene derivatives, polythiophenes, polyfluorenes, distilbiphenyl derivatives, diphenyl ethylene derivatives, diamino carbazole derivatives, cumarin compounds, naphthalene compounds, bisstyryl compounds, pyrazine compounds, and polybenzo carbozoles.

Of the materials of the luminous layer 13, a specific example of complexes of aluminum and quinolinol is tris (8-hydroxyquinolinate)aluminum ($Alq_3$), a specific example of complexes of beryllium and benzoquinolinol is a bis(benzoquinolinolate)beryllium complex, a specific example of europium complexes is a tri(dibenzoylmethyl)phenantoroline europium complex, a specific example of diphenyl ethylene derivatives is ditolyl vinyl biphenyl, and a specific example of polyparaphenylene vinylene derivatives is poly (2-methoxy-5-(2'-ethylhexyloxy)-1,4-(1-cyanovinylene) phenylene).

The light extracting layer 14 is formed between the transparent electrode 11 and the counter electrode 12, and lenses 15 are buried in this layer. The other known layers, such as a hole transport layer, an electron transport layer, a hole blocking layer, and an electron blocking layer, may be further provided between these electrodes. Light emitted from the luminous layer 13 is refracted or diffracted by the lenses 15, and advances toward the transparent electrode 11. By doing so, an angle of incidence of light incident on the transparent electrode 11 is changed, and the optical characteristic can be improved because a ratio of reflection occurring on the interface between the transparent electrode 11 and the light extracting layer 14 and the opposing surface is reduced. Moreover, because the transparent electrode 11, which is one of the components of the device, is used as the base material and the need to provide the base material separately to form the monolayer is eliminated, an increase of the thickness of the device can be suppressed.

As is shown in FIG. 6, a first monolayer 18 is formed on the interface between the light extracting layer 14 and the transparent electrode 11, and openings for disposing the lenses 15 are formed by the first monolayer 18. As with the embodiments described above, the first monolayer 18 has non-affinity for the lens material in comparison with the regions within the openings, and has a characteristic that its critical surface energy is 22 mN/m or lower. Hence, when the lens material is placed at the respective openings, the lens material will not diffuse by surmounting the edges of the openings. The respective lenses are therefore isolated from the adjacent lenses at regular intervals.

In this embodiment, the first monolayer 18 is formed by the same method as those in the other embodiments except that the transparent electrode 11 is used as the base material.

In this embodiment, in the case where an organic silane compound is used as the organic molecule to form the first monolayer, it is preferable that the surface of the base material has been subjected to surface treatment for the first monolayer to be formed with ease. The method of such a surface treatment can be a treatment using a silane coupling agent, an oxide coating treatment or the like. Such a surface treatment can increase a quantity of active hydrogen on the surface of the transparent electrode 11 that reacts with an organic silane compound. In the treatment using a silane coupling agent, a low molecular weight silane coupling agent having plural silol groups within one molecular or a group capable of forming a silol group through hydrolysis (chlorosilane and alkoxysilane groups), such as tetrachlorosilane, hexachlorodisiloxane, and tetramethoxysilane, is used. By subjecting the surface of the base material to the treatment using these silane coupling agents, a coating of one or more than one layer is formed on the surface of the base material. According to the oxidation coating treatment, an oxidation coating (for example, a silicon dioxide coating) in a layer of less than several atomic length is formed as the surface of the base material is subjected to the plasma treatment or the ozone treatment. A tunneling current is confirmed with both the coating and the first monolayer formed by the treatments as described above, and the characteristic of the light emitting device is not impaired even when these coating and layer are formed.

The lens material same as the lens material used in the first embodiment may be used in this embodiment; however, because the light extracting layer 14 is disposed between the transparent electrode 11 and the counter electrode 12, the lens material needs electrical conductivity at least in the vertical direction.

As a method of providing electrical conductivity to the lens material, for example, when the lens material consists essentially of resin, specific electrical conductivity can be obtained by using highly conductive resin.

Specifically, examples of such highly conductive resin include water-soluble epoxy acrylates, polypyrroles, polythiophenes, polyanilines, polypyrrole derivatives, polythiophene derivatives, and polyaniline derivatives. For example, it is confirmed that the electrical resistivity of a lens material made of water-soluble epoxy acrylate is $1\times10^9$ to $1\times10^{13}$ Ω·cm, and the electrical resistivity of a lens material made of polyaniline is $1\times10^{-2}$ to $1\times10^1$ Ω·cm.

In the case where the highly conductive resin as described above is used as the lens material, a method, such as heat curing or UV curing, as in the first embodiment may be used to form the lenses. The resin may be polymerized above the openings as another method. For example, when polypyrrole is used, the method as follows may be adopted.

Initially, an ethanol solution of pyrrole is placed at the openings by means of micro dispenser or the like. Subsequently, by coming into contact the lens material thus placed with an aqueous solution of ferric chloride or an alcohol solution, pyrrole undergoes polymerization to form lenses of polypyrrole.

As still another method, polyvinyl alcohol and an aqueous solution of ferric chloride or an alcohol solution is mixed, and the solution containing polyvinyl alcohol is placed at the openings by means of micro dispenser or the like. Subsequently, by coming into contact an ethanol solution of pyrrole with the solution containing polyvinyl alcohol by means of dropping, dipping, or the like, a pyrrole solution is mounted at the openings. Pyrrole thus mounted undergoes polymerization due to the function of ferric chloride to form lenses of polypyrrole.

Apart from the foregoing, in the case where the lens material consists essentially of resin having low electrical conductivity or an inorganic material, a lens material added with an electrical conductive substance is used.

Specifically, examples of such an electrical conductive substance include metal inorganic compounds, such as the foregoing ITO, IZO, zinc oxides, tin oxides, and indium oxides. Further, despite of reducing the transparency of the lens, examples of materials capable of suppressing such a reduction within tolerance for use in the optical device and providing electrical conductivity include carbon black, copper, copper alloy, silver, silver alloy, solder, nickel, and so forth. It is preferable to use these examples in the form of fine powder or filler.

Besides the electric conductive substances as specified above, conductive polymer particles can be used, representative examples of which include polypyrroles, polyanilines, and polythiophenes. Further, a material made by coating the periphery of powdery polymer or filler polymer with metal, such as gold, can be also used effectively.

A method of allowing the lens material to contain the electrical conductive substances as specified above is not particularly limited. In the case where the lens material consists essentially of resin, it is possible to use a solution prepared by mixing or kneading fine particles (including needle-shaped particles, such as filler, in terms of shapes) of the material, such as ITO specified above, with the resin.

Specifically, it is confirmed that a lens material made by adding, as the electrical conductive substance, powder of aniline polymer to resin consisting essentially of polymethyl methacrylate has electrical resistivity of $7\times10^{-2}$ to $1\times10^0$ Ω·cm, and a lens material made by adding, as the electrical conductive substance, fine particles of barium sulfate to a resin material consisting essentially of unsaturated polyester has the electrical resistivity of $3\times10^{-2}$ to $7\times10^1$ Ω·cm.

In the case where the lens material consists essentially of an inorganic material, for example, acetylacetonate indium sulfate, which is one of metal acetylacetonate materials of a sol-gel material, is used, a mixture of indium oxide, which is an electrical conductive substance, and tin is formed by preparing a mixed solution of the compound as specified above and tin. In this instance, although it depends on the formation condition, it is confirmed that the electric conductivity as high as $1\times10^{-4}$ to $1\times10^{-3}$ Ω·cm can be provided.

In this embodiment, when the lens material is placed at the openings, the method same as that described in the embodiments above may be used; however, in order to make the volume of each lens equal when a lens array is formed, it is preferable to use means for dropping the lens material at the openings using a dispenser, the ink jet method or the like by which a quantity of dropped lens material can be controlled.

As has been described, after the lens material is placed at the openings, the curing treatment may be applied to form the lenses as needed as in the first embodiment.

In this embodiment, the light extracting layer 14 has a flattening film 19 to bury the lenses 15. The flattening film 19 is provided to make the irregular surface comprising the first monolayer 18 and the lenses 15 to be flat.

An organic material is chiefly used as a material forming the flattening film 19. Also, it is preferable that the material of the flattening film 19 can be used in a method using the wet process (for example, rotational coating). Specifically, examples include materials, such as methacrylate compounds, acrylate compounds, silicone compounds, urethane compounds, acryl-silicon compounds, and organoalkoxysilane compounds. Alternatively, an inorganic material may be used as the material of the flattening film 19. Specifically, examples include materials, such as silicate compounds and alkoxysilane compounds. More specific examples of the material include: acrylate compounds, such as polyester acrylates, polyether acrylates, epoxy acrylates, and urethane acrylates; and organoalkoxysilane compounds, such as glycidoxypropyltrimethoxysilane. These materials are selected according to the configuration of the light extracting layer 14, such as the lenses 15, and the optical characteristic of the respective components, such as the transparent electrode 11 and the luminous layer 13.

As with the lenses 15, the flattening film 19 generally has poor electrical conductivity, and it is therefore preferable to provide the electrical conductivity at least in the vertical direction of the base material. The method same as the method of providing the electrical conductivity to the lens material is adopted as the method of providing the electrical conductivity to the flattening film 19.

The flattening film 19 is formed by applying the materials as specified above onto the lenses 15 by a method, such as spin coating, followed by curing as needed. For example, in the case where a copolymer of glycidyl methacrylate and 4'-methacryloylo oxychalcone is used as the material of the flattening film 19, a cyclohexane solution thereof is prepared, and the resulting solution is spin coated on the lenses 15. Subsequently, baking at 100° C. for 10 minutes is performed, and UV curing is performed, and further baking at 120° C. for 20 minutes is performed to form the flattening film 19.

In this embodiment, the electrical conductivity indicated by the electrical resistivity of the entire light extracting layer 14 is preferably $1 \times 10^{-2}$ to $1 \times 10^{13}$ Ω·cm. Emission of light is likely to be impaired when the electrical resistivity is outside this range. The electrical resistivity is measured separately from a current-to-voltage characteristic when a measurement sample is pinched between two electrodes made of gold of the column structure.

In this embodiment, as is shown in FIG. 6, the convex lenses 15 that protrude downward in the drawing have been described by way of example; however, convex lenses 15 that protrude upward in the drawing may be formed depending on the configuration of the light emitting device and the manufacturing processes. In this case, the luminous layer 13 is used as the base material.

FIG. 7A through FIG. 7G are views showing the manufacturing steps of the light emitting device (organic EL element) according to this embodiment. The manufacturing method of the organic EL element known in the related art is basically used except that the light extracting layer 14 is formed between the electrodes.

Figure 7A:
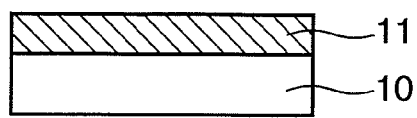
FIG. 7A through FIG. 7G are schematic views showing a manufacturing method of the light emitting device according to a sixth embodiment.

Initially, as is shown in FIG. 7A, indium tin oxide (ITO) or the like is deposited at a specific thickness by means of sputtering to form the transparent electrode 11 made of ITO on a transparent substrate 10. For example, a light-transmitting substrate, such as a glass plate, is used as the transparent substrate 10.

The light extracting layer 14 is formed on the top surface of the transparent electrode 11.

Figure 7B:
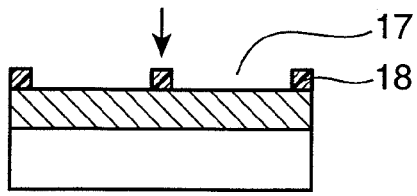
Figure 7C:
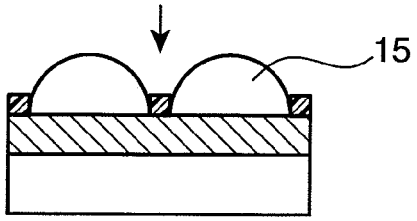

For the light extracting layer 14, the first monolayer 18 is formed first by the method described above to form the openings 17 on the transparent electrode 11 (FIG. 7B)

Figure 7D:
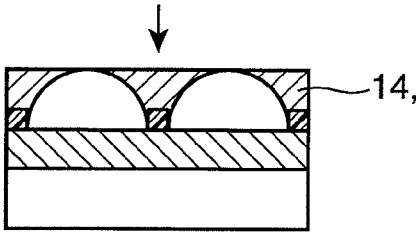

The electrical conducting lenses 15 are then disposed at the openings 17 thus formed by the method described as above (FIG. 7C), and the electrically conductive flattening film 19 is further formed on the first monolayer 18 and the lenses 15 to form the light extracting layer 14 (FIG. 7D).

Figure 7E:
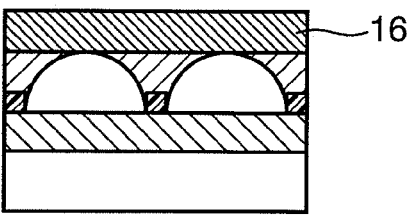

A hole transport layer 16 is formed on the light extracting layer 14 formed in this manner (FIG. 7E). The hole transport layer 16 is an optional component, and can be formed by the method using the material known in the related art. For example, the hole transport layer 16 is obtained by forming a thin film of a specific thickness by means of heating vapor deposition using N,N'-bis(3-methylphenyl)-N,N'-diphenyl-(1,1'-biphenyl)-4,4'-diamine (TPD) as the evaporation source.

Figure 7F:
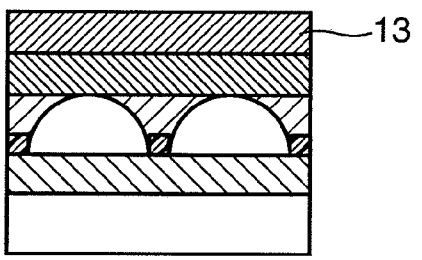

Subsequently, the luminous layer 13 is formed on the hole transport layer 16 (FIG. 7F). For example, the luminous layer 13 is formed on the hole transport layer 16 to have a specific thickness by means of vacuum vapor deposition using tris(8-hydroxyquinolinate)aluminum ($Alq_3$) as the evaporation source.

Figure 7G:
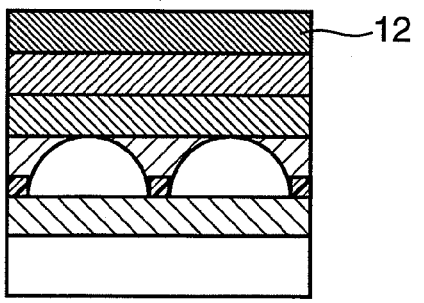

Subsequently, the counter electrode 12 is formed on the luminous layer 13 (FIG. 7G). For example, the counter electrode 12 is formed on the luminous layer 13 to have a specific thickness by means of vacuum vapor deposition with the use of a metal mask for forming the counter electrode, using aluminum-lithium alloy (content of Li: 15%) as the evaporation source.

The light emitting device housing the micro lenses that use one of the components forming the organic EL element as the base material can be manufactured as has been described.

This embodiment has described an example as the transparent electrode 11 is used as the base material; however, other components may be used as the base material. Also, in this embodiment, the micro lenses may be formed further on the surface of the transparent substrate 10 on the side opposite to the surface on which the electrodes are formed. The optical characteristic can be further improved by forming such micro lenses.

Other Embodiments

Besides the embodiments above, the invention include micro lens of the embodiments as follows.

(1) A material having a light reflecting property can be used for the base material. When such a base material is used, there is an effect that reflected light can be collected. As such a light-reflecting base material, metals, such as aluminum and silver, as well as silicon, can be used.

(2) The micro lens of the invention is not limited to a lens having a circular lens shape. A column-shaped lens or a lens having a bottom of a rectangular shape can be used as well. The lens having the rectangular bottom is preferable because the lens array can be of a dense structure, which makes it possible to reduce the lens pitch. Also, two or more kinds of lens shapes may be formed within the same base material.

This application claims the priority based on the prior Japanese Patent Application No. 2004-293608 filed with the Japanese Paten Office on Oct. 6, 2004, the entire contents of which are incorporated herein by reference.

While the invention will be described in detail by examples below, the examples are not intended to limit the invention, and it is understood that all the modifications in design in light of the descriptions above and below are included in the technical scope of the invention.

EXAMPLES

Example 1

A glass substrate (green plate glass available from Matsunami Glass Ind., Ltd., size: 50 mm×50 mm×0.8 mm; critical surface energy: about 70 mN/m) was used as the base material. The base material was subjected to ultrasonic cleaning using acetone (available from Kanto Chemical Corp.) for use in a semiconductor manufacturing process for two minutes, and immediately subjected to flowing-water cleaning with pure water for five minutes followed by drying by a spin dryer. After drying, the both surfaces of the base material were subjected to a cleaning treatment for 10 minutes by a UV/ozone cleaner (UV-300 available from SAMCO, Inc.).

Subsequently, positive resist (OFPR8000 available from Tokyo Ohka Kogyo Co., Ltd.) was formed at a thickness of 1 μm on one surface of the base material by means of rotational coating, and the base material was then subjected to baking at 80° C. A mask having plural openings of different sizes was placed on the resist, and the resist was exposed to UV rays by a UV exposing device and developed immediately with a developer (NMD-3 available from Tokyo Ohka Kogyo Co., Ltd.).

Apart from the foregoing, in order to form the first monolayer, a hydrofluoroether solution (HFE-7100 available from Sumitomo 3M Ltd.) (concentration: 2% by mass) of $CF_3(CF_2)_7(CH_2)_2SiCl_3$ (X-24-9367C available from Shin-Etsu Chemical Co., Ltd.) was prepared inside a glove box in a dry atmosphere at room temperature and a relative humidity value of 5% or lower (converted value at 22° C.).

The base material, on which the resist had been formed, was placed in the same glove box, and dipped in the prepared organic-molecule-containing liquid for two minutes. After the base material was pulled out from the solution, it was immediately subjected to rinse cleaning twice for five minutes in each using a hydrofluoroether rinse solution (HFE-7200 available from Sumitomo 3M Ltd.) inside the glove box to clean the surface of the base material. After it was visually confirmed that the base material was dried, the base material was taken out from the glove box.

Rinse cleaning for five minutes was repeated three times using acetone (available from Kanto Chemical Corp.) for use in a semiconductor manufacturing process to remove the resist on the base material.

Figure 8:
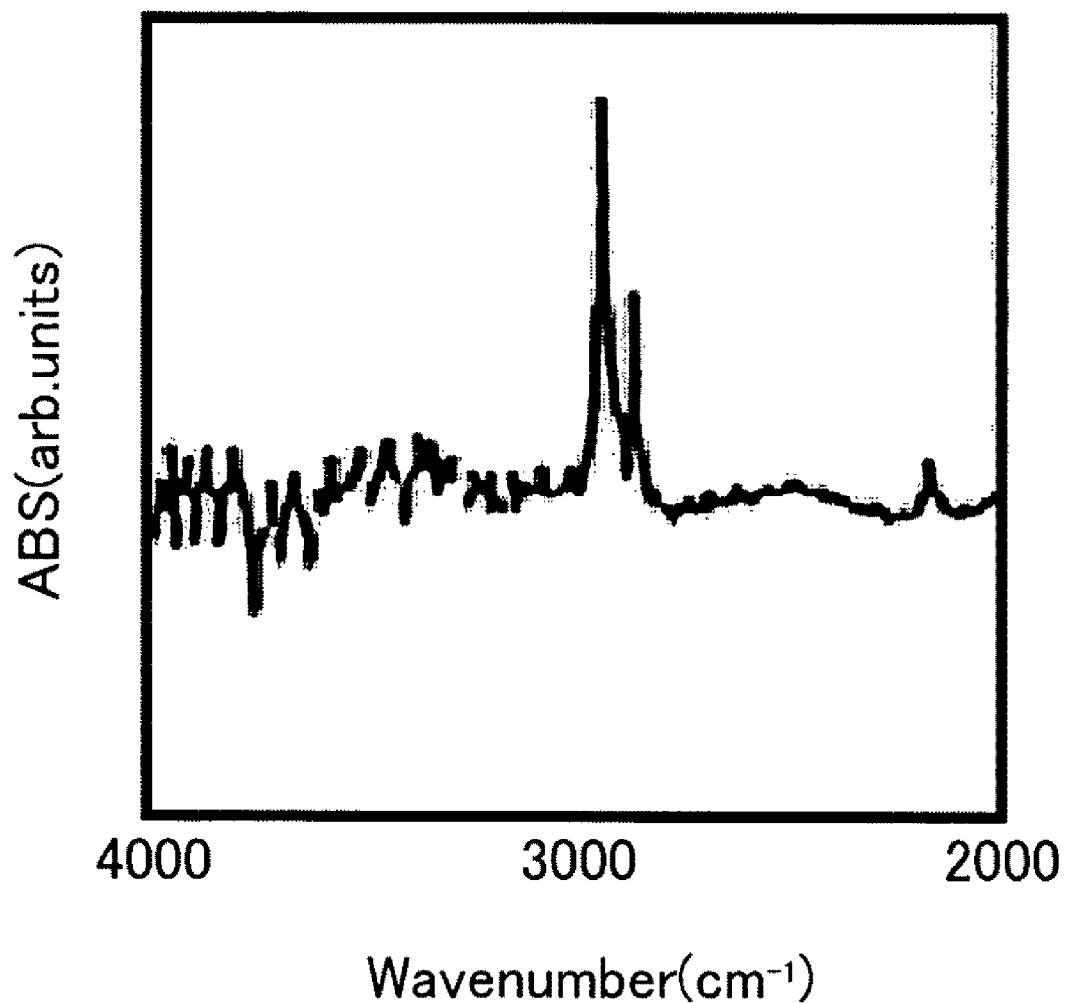
FIG. 8 shows an infrared absorption spectrum of a first monolayer in Example 1 of the invention.

The monolayer was confirmed by analyzing the molecular structure of the monolayer formed on the base material. FIG. 8 shows the measured spectrum of Fourier-transform infrared absorption spectrum of the monolayer thus formed. The vibrations of a $CH_2CH_2$ group in the molecular main chain were confirmed at the wavenumbers 2930 cm$^{-1}$ and 2860 cm$^{-1}$. Also, signals of $CF_3$ and $CF_2$ were confirmed in the measurement by the $^{19}$F-nuclear magnetic resonance spectrum. Further, a fragment of a specific mass equivalent to the molecular structure was confirmed in the measurement of the mass spectrometry spectrum. In view of the foregoing, the formation of the monolayer ($CF_3(CF_2)_7(CH_2)_2Si$—O—) on the base material was confirmed. In addition, it was confirmed that the monolayer had a thickness of 1.6 nm, which is almost equal to a length of one molecule, from the observation of a photograph on the cross section by a transmission electron microscope. Furthermore, the critical surface energy of the first monolayer thus formed was 8.5 mN/m.

Subsequently, UV curable resin (DAICURE [registered trade mark] Clear SD available form Dainippon Ink and Chemicals, Incorporated), as a lens material, was applied on the base material by a spin coater.

After coating, UV rays were irradiated onto the base material using a UV lamp (available from Sen Lights Corporation) to cure the resin. The micro lens array was thus formed. The critical surface energy of the lens material measured by using a planer plate prepared separately was 21.2 mN/m, and a difference of the critical surface energy between the lens material and the first monolayer was 12.7 mN/m.

Figure 9:
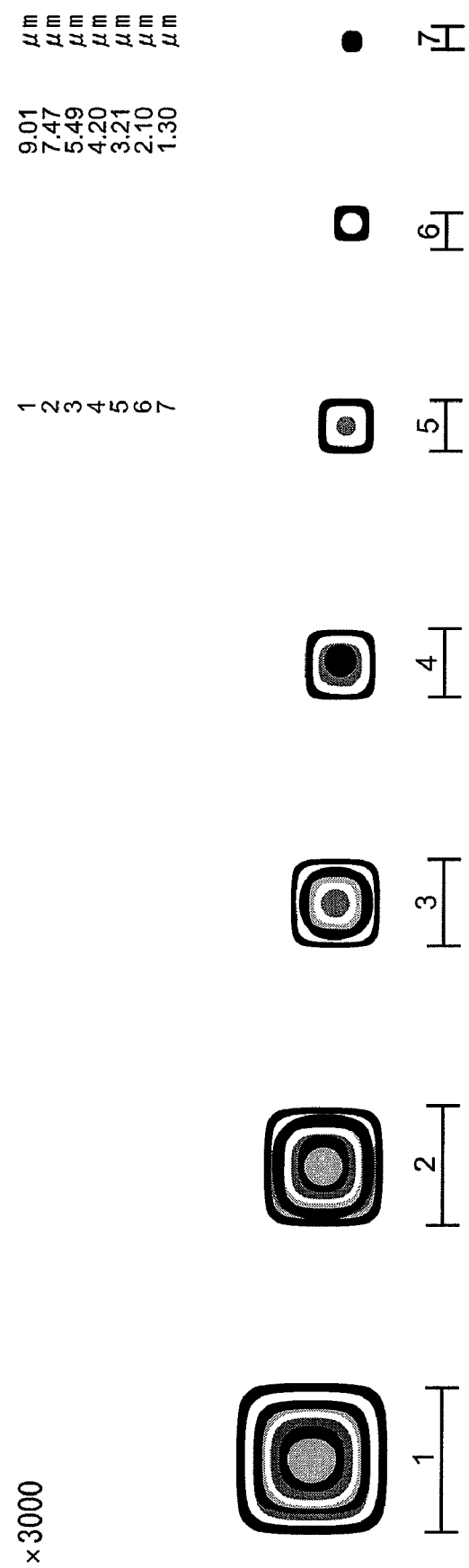
FIG. 9 is a schematic drawing based on an electron microscopic photograph of a micro lens array in Example 1 of the invention.

FIG. 9 is a schematic drawing based on an electron microscope photograph from above of the micro lens array formed at the regions within the rectangular openings of different sizes. Because interference fringes indicating the contours of the respective openings were confirmed, it is found that lenses were formed in the regions within the openings. All the lenses thus obtained were disposed at the regions within the openings formed in rectangular patterns, and it was confirmed that the lens material did not diffuse by surmounting the edges of the openings. Also, referring to FIG. 9, the sides of the bottom surfaces of the respective openings were 9.01, 7.47, 5.49, 4.20, 3.21, 2.10, and 1.30 μm in descending order. It was confirmed that these sizes are almost equal to the sizes of the openings in the mask.

Further, the lens height measured by a surface profilometer was 0.6 to 4.6 μm, and it was confirmed that the lenses were almost hemispherical lenses.

Example 2

A micro lens array was manufactured in the same manner as in Example 1 except that a mask having plural openings of the same size was used as a mask used in the formation of the resist during the manufacture of the micro lens array of Example 1.

Figure 10:
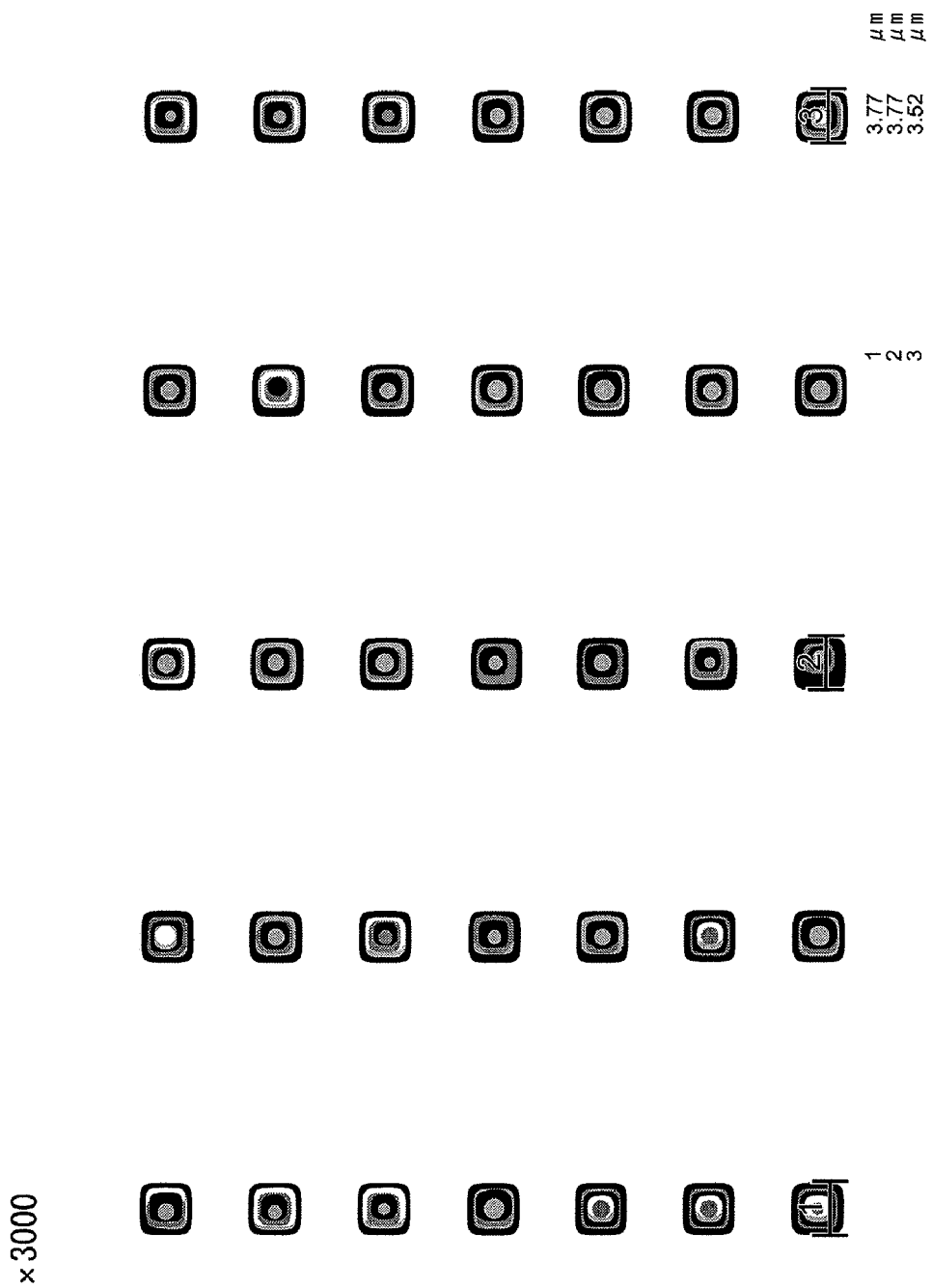
FIG. 10 is a schematic drawing based on an electron microscopic photograph of a micro lens array in Example 2 of the invention.

FIG. 10 is a schematic drawing based on an electron microscope photograph from above of the micro lens array formed in the regions within the rectangular openings of substantially the same size manufactured as described above. Because interference fringes indicating the contours of the respective openings were confirmed, it is found that lenses were formed in the regions within the openings. All the lenses thus obtained were disposed at the regions within the openings formed in rectangular patterns, and it was confirmed that the lens material did not diffuse by surmounting the edges of the openings. It is also confirmed that the lenses did not give influences to the adjacent lenses and the lenses were disposed without any omission. Three points measured as to the width of the openings were found to be 3.52 to 3.77 μm, the lens pitch was about 20 μm, and it was therefore confirmed that those sizes were almost equal to the sizes of the opening and the pitch in the mask, respectively. Also, the lens height was 1.71 to 1.89 μm and all the lenses were of almost a hemispherical shape.

Example 3

The first monolayer was formed in the same manner as in Example 2 except that $CF_3(CH_2)_2(CH_3)_2Si(CH_2)_{15}SiCl_3$ (available from Shin-Etsu Chemical Co., Ltd., and manufactured by the manufacturing method described in JP-A-4-120082; structure of the monolayer: $CF_3(CH_2)_2(CH_3)_2Si(CH_2)_{15}Si$—O—) was used as the organic molecule in the formation of the first monolayer in Example 2. The thickness and the critical surface energy of this first monolayer were about 1 nm and 17.9 mN/m, respectively.

Apart from the foregoing, the lens material was prepared. A cyclohexane solution of a copolymer of glycidyl methacrylate and 4'-methacryloylo oxychalcone was prepared as the lens material.

The base material, on which the first monolayer had been formed, was dipped in the solution thus prepared. After the base material was pulled out from the solution, the lens material was cured by the same method as in Example 1 to form the micro lens array.

The critical surface energy of the cured lens material was about 40 mN/m and a difference of the critical surface energy between the lens material and the first monolayer was about 22 mN/m.

The formation of almost hemispherical lenses same as those in Example 2 were confirmed in the micro lens array thus obtained. Three points measured as to the width of the openings were found to be 5.11 to 5.27 μm, the lens pitch was about 20 μm, and the lens height was 1.9 to 2.1 μm.

Example 4

The first monolayer was formed in the same manner as in Example 2 except that $CF_3(CF_2)_3(CH_2)_2(CH_3)_2Si(CH_2)_9SiCl_3$ (available from Shin-Etsu Chemical Co., Ltd., and manufactured by the manufacturing method described in JP-A-4-120082; structure of the monolayer: $CF_3(CF_2)_3(CH_2)_2(CH_3)_2Si(CH_2)_9Si$—O—) was used as the organic molecule in the formation of the first monolayer in Example 2. The thickness and the critical surface energy of this first monolayer were about 1 nm and 11.5 mN/m, respectively.

Subsequently, the micro lenses were formed by the same method as in Example 3 using the same lens material as in Example 3.

A difference of the critical surface energy between the lens material and the first monolayer was about 28.5 mN/m.

The formation of almost hemispherical lenses same as those in Example 2 were confirmed in the micro lens array thus obtained. Three points measured as to the width of the openings were found to be 5.03 to 5.25 μm, the lens pitch was about 20 μm, and the lens height was 1.9 to 2.2 μm.

Example 5

A micro lens array was manufactured in the same manner as in Example 2 except that the second monolayer was formed in the regions within the openings before the lens material was placed at the openings during the manufacture of the micro lens arrays in Example 2.

The base material used herein was a base material having the first monolayer formed in the same manner as in Example 2 on the surface in specific patterns. The second monolayer was formed according to the method as follows in the regions within the openings formed on the surface of the base material using the first monolayer.

Initially, the base material, on which the first monolayer had been formed, was subjected to ultrasonic cleaning using acetone, flowing-water cleaning using pure water, and drying by a spin dryer in the same manner as the glass substrate in Example 1.

Subsequently, the second monolayer (structural formula: $CH_3(CH_2)_7Si$—O—) was formed in the regions within the openings by dipping the base material into the organic-molecule-containing liquid in the same manner when the first monolayer was formed in the manufacture of the micro lens array of Example 1 except that $CH_3(CH_2)_7SiCl_3$ (n-octyl silane available from AZmax Co.) was used to form the second monolayer.

Figure 11:
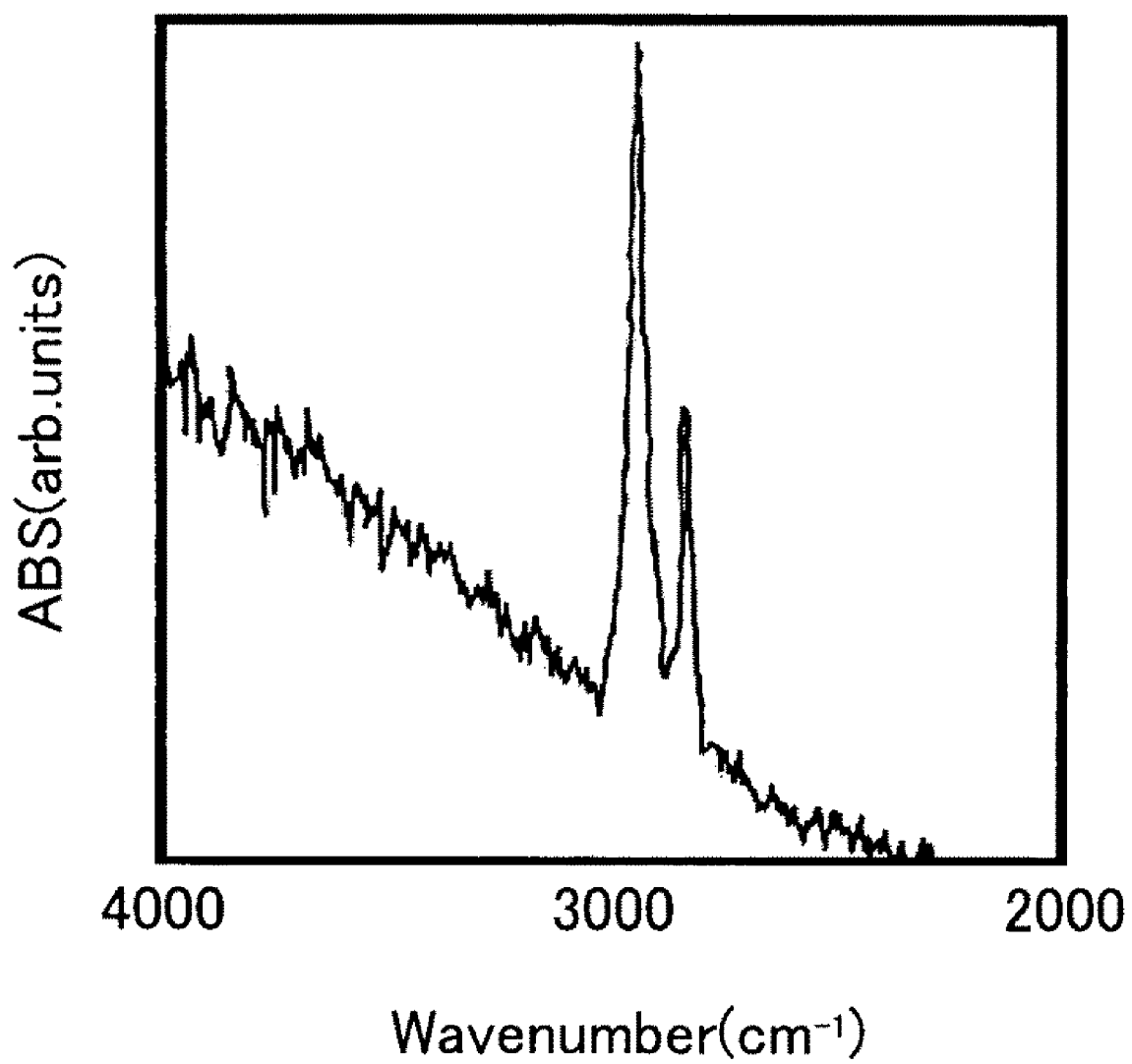
FIG. 11 shows an infrared absorption spectrum of a second monolayer in Example 5 of the invention.

The second monolayer was confirmed by analyzing the molecular structure of the monolayer formed on the base material. FIG. 11 shows the measured spectrum of Fourier-transform infrared absorption spectrum of the second monolayer thus formed. The vibrations of a $CH_2CH_2$ group in the molecular main chain were confirmed at the wavenumbers 2930 cm$^{-1}$ and 2860 cm$^{-1}$. The thickness of the second monolayer was 1.2 nm. Because the areas within the openings were small, the infrared absorption spectrum and the thickness of the second monolayer were measured by using a pattern (a square of 20 mm×20 mm) formed separately on the same base material. Also, the critical surface energy of the second monolayer was 20.3 mN/m, and a difference of the critical surface energy between the second monolayer and the lens material was 0.9 mN/m.

Subsequently, the lenses were formed in the same manner as in Example 1 using the base material on which the first monolayer and the second monolayer had been formed, and thus the micro lens array was formed.

Figure 12:
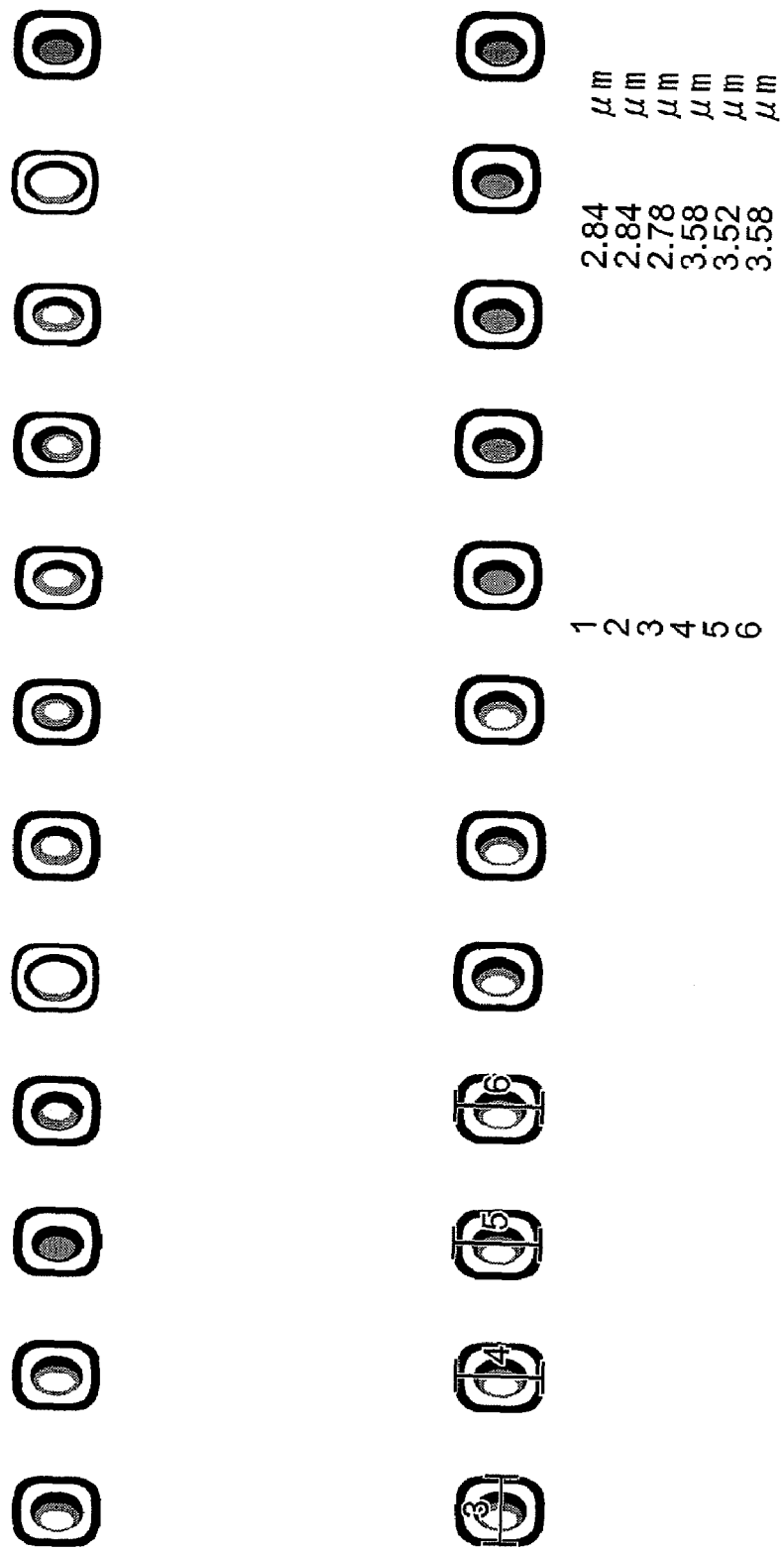
FIG. 12 is a schematic drawing based on an electron microscopic photograph of a micro lens array in Example 5 of the invention.
Figure 13:
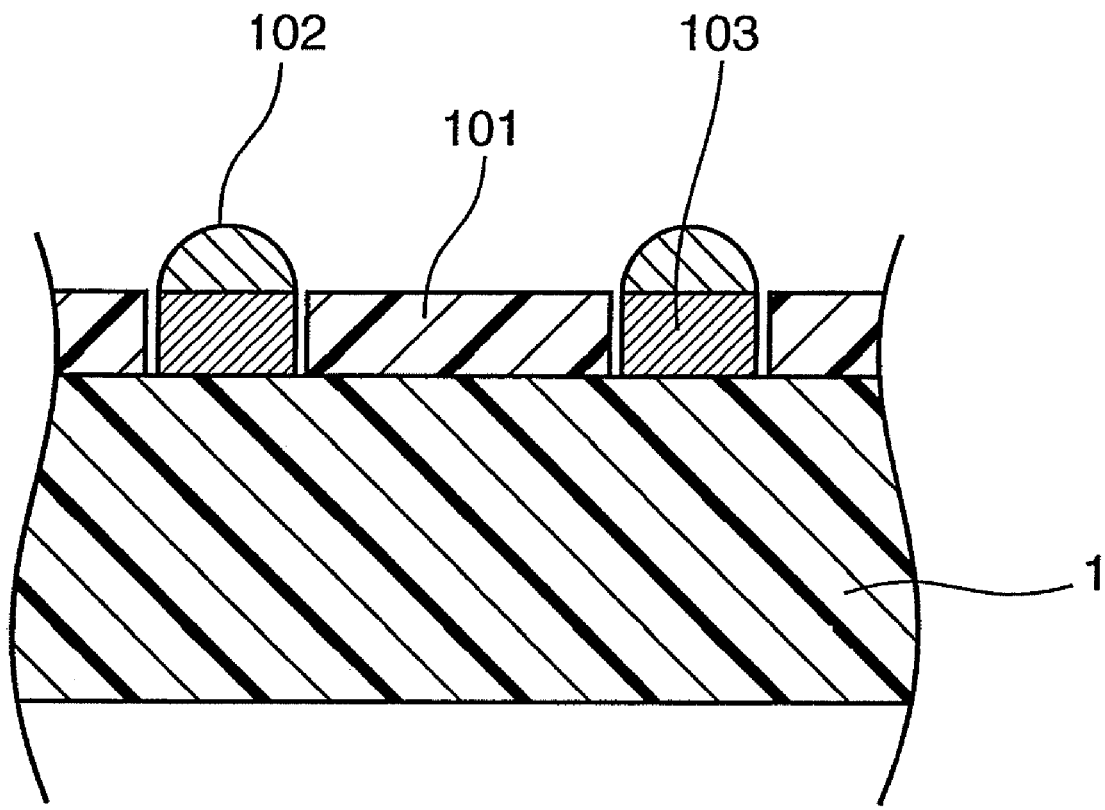
FIG. 13 is a schematic cross sectional view showing micro lenses in the prior art.

FIG. 12 is a schematic drawing based on an electron microscope photograph from above of the micro lens array thus obtained. Because interference fringes indicating the contours of the respective openings were confirmed, it is found that lenses were formed at the regions within the openings. All the lenses thus obtained were disposed at the regions within the openings formed in rectangular patterns, and it was confirmed that the lens material did not diffuse by surmounting the edges of the openings, the lenses did not give influences to the adjacent lenses, and the lenses were disposed without any omission.

Three points measured as to the width and the length of the openings were found to be 2.78 to 2.84 μm and 3.52 to 3.58 μm, respectively. The lens pitch was about 5.5 μm. It was therefore confirmed that those sizes are almost equal to the sizes of the opening and the pitch in the mask, respectively. Also, the lens height was 1.40 to 1.41 μm and all the lenses were of almost a hemispherical shape.

Comparative Example 1

A micro lens array was manufactured according to Example 3 in US-A1-2004-163758 using a method of forming a monolayer on the base material by means of stamping.

Initially, a solution was prepared by mixing 1 part by mass of a curing agent with 10 parts by mass of silicone RTV rubber (available from Shin-Etsu Chemical Co., Ltd.) followed by defoaming. The solution was supplied onto a stainless plate provided with pits and projections in specific patterns, and allowed to stand for 24 hours at room temperature to be cured. The cured rubber was peeled off from the stainless plate after it had cured. A stamp, onto which the pits and projections of the stainless were transferred, was thus formed.

Subsequently, an organic-molecule-containing liquid to be transferred was prepared. Preparation and transferring to the stamp surface of the organic-molecule-containing liquid, and the transferring of the organic molecule to the base material were all conducted at room temperature under the environment to be exposed to outside air having relative humidity of 77% (converted value at 22° C.) without being changed to a dry atmosphere. For the purpose of comparison, $CF_3(CF_2)_7(CH_2)_2SiCl_3$ (X-24-9367C available from Shin-Etsu Chemical Co., Ltd.) used in Example 1 was used as the organic molecule. The organic molecule was added in a dish, and the stamp surface of the stamp formed as described above was dipped in the solution in the dish. An small quantity of solution was thus transferred onto the stamp surface. In this instance, a whitish substance, which is regarded polysiloxane as a polymerization reactant of the organic molecule, was found on the stamp surface.

An N-type silicon wafer (available from Shin-Etsu Chemical Co., Ltd.) was prepared as the base material used as the target of transfer. The stamp was pressed against the silicon wafer for the organic molecule on the stamp surface to be transferred onto the wafer. It was visually confirmed that the whitish substance was transferred onto the wafer at the portion pressed by the stamp surface; however, it was not confirmed that the patterns of pits and projections provided to the stamp were transferred onto the wafer.

From the confirmation of the formation state of the transferred substance, the whitish substance was transferred and the thickness thereof was assumed to be 400 nm or larger. Also, adhesion of the transferred whitish substance to the base material was poor and it was readily separated. In addition, the angle of contact varied markedly from point to point measured. The critical surface energy was 41.2 mN/m as an average of six points.

The lens material was applied onto the base material thus obtained in the same manner as in Example 1. Whether the lens material was placed at the regions corresponding to the pits in the stamp was checked though, the formation of lenses was not confirmed.

Comparative Example 2

The first monolayer was formed in the same manner as in Example 2 except that $CH_2=CH(CH_2)_{17}SiCl_3$ (available from Shin-Etsu Chemical Co., Ltd.; structure of monolayer: $CH_2=CH(CH_2)_{17}Si—O—$) was used as the organic molecule in the formation of the first monolayer in Example 2. The critical surface energy of the first monolayer was 31.0 mN/m.

The same lens material used in Example 1 (a difference of critical surface energy between the first monolayer and the lens material: 9.8 mN/m) was used, and the lens material was applied onto the base material manufactured as described above in the same manner as in Example 1, and as a result, diffusion of the lens material from the openings was observed. It was also confirmed that the lens material adhered to regions other than the regions in which the openings were formed.

Example 6

A light emitting device having the light extracting layer in which micro lenses were formed was manufactured as follows.

An electrode substrate (available from Matsunami Glass Ind., Ltd.) was prepared, which was obtained by forming, as a transparent electrode (anode), indium tin oxide (ITO) in specific patterns on a glass substrate. The sheet resistance value and the film thickness of the ITO layer on the substrate were about 20 Ω/sq and about 100 nm, respectively.

A positive photo-resist (OFPR-800 available from Tokyo Ohka Kogyo Co., Ltd.) was applied on the ITO layer to have the film thickness of about 1 μm by means of spin coating. After the pre-baking step of the resist was performed, exposure and development were performed using a photo-mask having specific patterns (a mask provided with a pattern array having a diameter of 1 μm at positions corresponding to picture elements).

Apart from the foregoing, in order to form the first monolayer, a hydrofluoroether solution (HFE7100 available from Sumitomo 3M Ltd.) (concentration: 1% by volume) of $CF_3$ $(CF_2)_7(CH_2)_2SiCl_3$ (X-24-9367C available from Shin-Etsu Chemical Co., Ltd.) was prepared in a glove box in a dry atmosphere at room temperature and a relative humidity value of 5% or lower (converted value at 22° C.).

After the glass substrate, on which the resist had been formed, was placed in the glove box and exposed to a dry atmosphere in sufficient time, the glass substrate was dipped in a container filled with the solution above. The dipping time was 15 minutes during which the solution was kept stirred gently by a stirrer.

Two containers, into each of which hydrofluoroether was poured for use of cleaning, were placed in the glove box. Immediately after the dipping ended, the glass substrate was dipped in the solutions in the cleaning containers thus prepared for the glass substrate to be cleaned. Cleaning was performed for five minutes in each container (10 minutes in total), and after it was visually confirmed that the surface of the glass substrate was not wet by a solvent or the like, it was taken out from the glove box.

The glass substrate taken out from the glove box was further cleaned with pure water, and droplets on the surface of the glass substrate were removed using a nitrogen gas. The glass substrate was then kept in a dry container.

Subsequently, the glass substrate was dipped in a container filled with acetone, and the positive resist formed on the surface of the glass substrate was removed. In order to remove the resist completely, cleaning using acetone was repeated twice. The patterns of the first monolayer were formed on the ITO layer by these steps. Formation of the first monolayer was confirmed by the Fourier-transform infrared absorption spectrum and the X-ray photoelectron spectroscopic analysis.

Apart from the foregoing, the lens material was prepared. A solution was prepared by adding 5% by mass of a photo-polymerization initiator (Irgacure available from Nagase & Co., Ltd.) as an additive and 5% by mass of water to 90% by mass of UV curable resin (water-soluble epoxy acrylate available from Arakawa Chemical Industries, Ltd.).

The solution prepared as above was dropped onto the glass substrate, and rotational coating (for 10 seconds at a rotational velocity of 500 rpm) was performed.

Subsequently, UV rays were irradiated to the glass substrate for 10 seconds using a photo curing device (HANDY CURERUB available from Sen Lights Corporation) having illumination intensity of 80 mW/cm$^2$ for photo-curing to take place on the glass substrate in a portion to which the solvent was adhering. When the surface of the glass was observed with a microscope, the formation of hemispherical lenses was confirmed. The electrical resistivity of the lens material was $1 \times 10^9$ to $1 \times 10^{13}$ Ω·cm.

Apart from the foregoing, a cyclohexane solution of a copolymer of glycidyl methacrylate and 4'-methacryloylo oxychalcone was prepared as the material of the flattening film.

After the solution for forming the flattening film was dropped onto the glass substrate on which the lenses had been formed and a thin film was formed to have the film thickness of about 500 nm using a spin coater, pre-baking was performed at 100° C. for 10 minutes and UV rays were irradiated to the thin film for 30 seconds using a high-pressure mercury vapor lamp at 360 mJ/cm$^2$. Finally, the thin film was cured sufficiently by the post baking at 120° C. for 20 minutes. The electrical resistivity of the flattening film thus formed was $1 \times 10^8$ to $1 \times 10^{13}$ Ω·cm.

The glass substrate, on which the flattening film had been formed, was placed in a resistance heating vapor deposition device. TPD was formed at the film thickness of about 50 nm as the hole transport layer under a reduced pressure at vacuum of $10^{-6}$ Torr. The vapor deposition rate of TPD was 0.2 nm/s.

Subsequently, $Alq_3$ was formed on the hole transport layer at the film thickness of about 60 nm as the luminous layer in the resistance heating vapor deposition in the same manner as above. The vapor deposition rate of $Alq_3$ was 0.2 nm/s.

Further, the cathode serving as the counter electrode was formed on the luminous layer at the film thickness of 150 nm using Al—Li alloy containing 15 atomic percent of Li as the evaporation source inside the resistance heating vapor deposition device in the same manner as above. These film deposition methods by means of vacuum vapor deposition were performed according to JP-A-2001-085157.

A quantity of extracted light of the light emitting device manufactured as has been described was measured. The evaluation was made according to the method described in *Opt. Lett.*, 22, 6, 396 (1997), Princeton University. Consequently, a 2.1-fold increase of a quantity of extracted light was confirmed in comparison with a sample having no lenses. A 4-fold increase of a quantity of extracted light was confirmed from the optical design simulation.

As has been described in detail above, according to the micro lens of the invention, because the opening, at which the lens is disposed, is formed by covering the surface of the base material with the monolayer having a film thickness of 30 nm or smaller, the depth of the opening can be reduced. The lens disposed at the opening can therefore have a reduced thickness at the lens bottom portion, which can in turn shorten the optical path length.

According to the invention, the surface of the base material and the first monolayer are bound with each other via a covalent bond. This bond is an extremely strong bond. Hence, different from the resin matrix, the concern as to a problem of separation can be reduced at the time of handling. It is thus possible to obtain a lens at high definition with a sharp contour even when applying to a fine micro lens is formed.

The first monolayer forming the opening in the invention has the critical surface energy of 22 mN/m or lower and shows non-affinity for the lens forming material in comparison with the region within the opening. Diffusion of the lens material can be therefore prevented sufficiently when the lens material is placed at the opening. This enables micro lens to be formed at high definition even when the lens diameter is small.

Further, when applying the invention to a micro lens array in which plural micro lenses as described above are formed, since a dense monolayer can be formed selectively in contrast to the resin matrix in which fine patterns cannot be formed readily, a lens array at high density can be obtained. Even in the case of a lens array having a narrower lens pitch, because diffusion of the lens material placed at the adjacent opening can be suppressed, the influences of the adjacent lenses can be reduced. Hence, even when the lens density is increased, a micro lens array at high definition can be obtained. Moreover, even when a fine lens is formed, the lens can remain homogeneous because the lens shape will not be impaired.

Also, because the first monolayer of the invention is formed by covalently binding the organic molecule with the surface of the base material, the degree of non-affinity for the lens material can be changed with the kinds of organic molecules, whereby the selection conditions of the lens material are relaxed. Further, the resulting lens can be of various shapes.

Furthermore, for the micro lens of the invention, it is preferable that a difference of the critical surface energy between the first monolayer and the lens material is 12 mN/m or larger.

By forming the micro lens having the characteristic as described above, diffusion of the lens material from the opening can be further suppressed.

According to the micro lens of the invention, the first monolayer is formed by bringing an organic molecule represented by General Formula below or its derivate into contact with the base material.

$$CF_xH_y—(C_bL_{2b})-Z-D_qE_r \quad (S1)$$

where x is an integer from 1 to 3, y is an integer from 0 to 2, x+y is 3; $C_bL_{2b}$ is a straight chain a branched chain, L is H or F, and b is an integer from 2 to 24; Z is one element selected from Si, Ti, Al and Sn; D is one characteristic group selected from halogen, $OCH_3$, $OC_2H_5$, and OCN; E is one characteristic group selected from the group consisting of hydrogen, $CH_3$, $C_2H_5$, and $C_3H_7$; and q is an integer from 1 to 3, r is an integer from 0 to 2, q+r is 3.

With the use of such an organic molecule, it is possible to form the first monolayer that not only excels in formation of the covalent bond with the base material, but also has low critical surface energy and large non-affinity for the lens material.

According to the invention, it is preferable to use at least one organic molecule selected from the group consisting of $CF_3(CF_2)_7(CH_2)_2SiCl_3$, $CF_3(CH_2)_2(CH_3)_2Si(CH_2)_{15}SiCl_3$, $CF_3(CF_2)_3(CH_3)_2Si(CH_2)_9SiCl_3$, and $CF_3(CF_2)_7(CH_2)_2(CH_3)_2Si(CH_2)_9SiCl_3$.

With the use of such an organic molecule, the first monolayer having low critical surface energy can be readily formed.

According to the micro lens of the invention, the opening is of a concave shape, and a longitudinal diameter or a long side of a concave portion is 10 nm or larger and 1,000,000 nm or smaller.

It is preferable for the micro lens of the invention that a second monolayer thinner than the thickness of the first monolayer and showing affinity for the lens material is further formed in the region within the opening, and the second monolayer is fixed to the surface of the base material by a covalent bond.

By forming the micro lens having the structure above, the non-affinity between the region within the opening and the first monolayer is increased, which can in turn prevent diffusion of the lens material further.

Also, in the method of manufacturing the micro lens of the invention, it is preferable to perform the monolayer forming step through a liquid phase treatment under environments that a relative humidity value is 35% or lower (a value converted to a relative humidity value at 22° C.).

By performing the liquid phase treatment in such a low humidity atmosphere, reactions among highly active organic molecules can be suppressed, and thus a thin first monolayer having excellent resistance to separation and high non-affinity for the lens material can be thus formed.

Further, the micro lens of the invention can use a component of the light emitting device as the base material. In other words, the invention is used for a light emitting device having a micro lens, which comprises a pair of electrodes, a luminous layer between the electrodes, and a light extracting layer between the electrodes, wherein the light extracting layer has a first monolayer of a predetermined pattern on one surface side and the micro lens disposed between the patterns of the first monolayer.

When configured in this manner, it is possible to provide a light emitting device with an increased quantity of extracted light.

Example 6 above described a case where the micro lens of the invention were applied to the light emitting device; however, the invention is effective to a light emitting device having plural luminous layers. Further, as applications other than applications to light emitting device, the invention can be used as a light emitting device, such as a backlight illumination device in a liquid crystal display, an LED illumination device, a coupling device in optical communications, a light diffusing device for removing irregularity in light quantity of flat light, a lens array for stereoscopic recognition, a collective spot array for measurement, a leak portion of near-field light and a capturing portion of leaked light (in this case, the size of the opening at which the lens or the lens array is disposed needs to be 100 nm or smaller; although the lower limit value of the size of the opening was 10 nm or larger in the specification due to the limitation of the current manufacturing device, it is predicted that the same effect can be obtained even when the size becomes lower than the lower limit), a multipoint simultaneous measuring tool for biosensing (genes, protein, and the like).

The invention claimed is:

1. A micro lens comprising a base material and a lens formed on the base material, wherein:
   the lens is disposed at an opening on the base material;
   the opening is formed by covering a surface of the base material with a first monolayer;
   the first monolayer has critical surface energy of 22 mN/m or lower, shows non-affinity for a lens material in comparison with a region within the opening, and is fixed to the surface of the base material via a covalent bond; and
   a second monolayer which is thinner than the first monolayer and shows affinity for the lens material is further formed in the region within the opening, and the second monolayer is fixed to the surface of the base material via a covalent bond.

2. The micro lens according to claim 1, wherein:
   the first monolayer has a thickness of 30 nm or smaller.

3. The micro lens according to claim 1, wherein:
   a difference of the critical surface energy between the first monolayer and the lens material is 12 mN/m or larger.

4. The micro lens according to claim 1, wherein:
   the first monolayer is formed by bringing an organic molecule represented by General Formula below or a derivative thereof into contact with the base material,

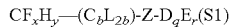

$$CF_xH_y\text{—}(C_bL_{2b})\text{-}Z\text{-}D_qE_r \quad (S1)$$

where x is an integer from 1 to 3, y is an integer from 0 to 2, x+y is 3; $C_bL_{2b}$ is a straight chain or a branched chain, L is H or F, and b is an integer from 2 to 24; Z is one element selected from Si, Ti, Al and Sn; D is one characteristic group selected from halogen, $OCH_3$, $OC_2H_5$, and OCN; E is one characteristic group selected from the group consisting of hydrogen, $CH_3$, $C_2H_5$, and $C_3H_7$; and q is an integer from 1 to 3, r is integer from 0 to 2, q+r is 3.

5. The micro lens according to claim 4, wherein:
   the organic molecule represented by General Formula (S1) or the derivative thereof is at least one organic molecule selected from the group consisting of $CF_3(CF_2)_7(CH_2)_2SiCl_3$, $CF_3(CH_2)_2(CH_3)_2Si(CH_2)_{15}SiCl_3$, $CF_3(CF_2)_3(CH_3)_2Si(CH_2)_9SiCl_3$, and $CF_3(CF_2)_7(CH_2)_2(CH_3)_2Si(CH_2)_9SiCl_3$.

6. The micro lens according to claim 1, wherein:
   the opening is of a concave shape and a longitudinal diameter or a long side of a concave portion is 10 nm or larger and 1,000,000 nm or smaller.

7. A micro lens array including the micro lens according to claim 1.

8. The micro lens array according to claim 7, wherein:
   a lens pitch of the micro lens array is 10 nm or larger and 1,000,000 nm or smaller.

9. A method of manufacturing the micro lens according to claim 1, comprising:
   bringing an organic molecule into contact with a region having active hydrogen on a surface of the base material, the organic molecule having a terminal binding functional group capable of forming a covalent bond through a condensation reaction with the active hydrogen at one terminal and a terminal group showing non-affinity for a lens material at the other terminal;
   forming an opening on the base material by selectively fixing a first monolayer showing non-affinity for a lens material to the surface of the base material by forming the covalent bond through the condensation reaction of the terminal binding functional group and the active hydrogen; and
   forming the micro lens by disposing the lens material at the opening.

10. The method of manufacturing a micro lens according to claim 9, wherein:
    the first monolayer is formed by a liquid phase treatment in an atmosphere at a relative humidity value (a value converted to a relative humidity value at 22° C.) of 35% or lower.

* * * * *